United States Patent [19]

Henry et al.

[11] 4,217,658

[45] Aug. 12, 1980

[54] PROCESS CONTROL SYSTEM THAT CONTROLS ITS OUTPUTS ACCORDING TO THE RESULTS OF SUCCESSIVE ANALYSIS OF THE VERTICAL INPUT COLUMNS OF A HYPOTHETICAL LADDER DIAGRAM

[75] Inventors: Donald E. Henry, Bettendorf, Iowa; Thomas A. Murrell, Urbana, Ill.; Marvin H. Schilt, Bettendorf, Iowa; Alfred C. Weaver, Champaign, Ill.

[73] Assignee: Struthers-Dunn, Inc., Pitman, N.J.

[21] Appl. No.: 819,038

[22] Filed: Jul. 25, 1977

[51] Int. Cl.² .......................................... G06F 15/46
[52] U.S. Cl. .................................. 364/900; 364/104
[58] Field of Search .............. 364/200 MS File, 104, 364/107, 117, 900 MS File

[56] References Cited

U.S. PATENT DOCUMENTS

| | | | |
|---|---|---|---|
| 3,663,950 | 5/1972 | Bartlett | 323/24 |
| 3,761,882 | 9/1973 | Bartlett et al. | 364/900 |
| 3,798,612 | 3/1974 | Struger et al. | 364/900 |
| 3,881,172 | 4/1975 | Bartlett et al. | 364/900 |
| 3,921,146 | 11/1975 | Danco | 364/900 |
| 4,006,464 | 2/1977 | Landell | 364/104 |
| 4,021,783 | 5/1977 | Highberger | 364/900 |
| 4,025,902 | 5/1977 | Nakao et al. | 364/900 |

OTHER PUBLICATIONS

MOS Technology, Inc., "Microcomputers Programming Manual," Norristown, Penn.
Weaver, Alfred C., Doctoral Thesis, "A Graphically--Programmed, Microprocessor Based Industrial Controller," (1976), (Unv. Ill.).
Weaver, Alfred C., Master's Thesis, "Viptran-A Programming Language and its Compiler for Boolean Systems or Process Control Equations," (Nov. 1973), Univ. of Ill.
Weaver, Alfred C., "Viptran 2-An Improved Programming Language and its Compiler for Process Control Equations," (May 1974), Univ. of Ill.
MOS Technology, Inc., "Microcomputers Hardware Manual," Norristown, Penn.

*Primary Examiner*—Mark E. Nusbaum
*Attorney, Agent, or Firm*—William D. Hall

[57] ABSTRACT

A process control system for controlling a set of outputs according to a multiplicity of inputs. The process control system analyzes the condition of the inputs as though they were arranged in a hypothetical ladder diagram which is a representation of the circuitry that would be required to control the loads if simple switches were interconnected, by wires, in the conventional way to control the loads. The hypothetical ladder diagram includes a plurality of hypothetical horizontal rows of circuit elements in which the circuit elements are also located in hypothetical vertical columns. All of the hypothetical vertical columns, except the last, are "input" vertical columns since they represent input circuit elements. The last vertical column contains the loads (or outputs) and is an "output" vertical column. The hypothetical input vertical column at the left end of the hypothetical ladder is first analyzed by the processing unit to determine whether there is a potential (binary 1), or no potential (binary 0), at the output of each circuit element of that hypothetical vertical column. These outputs of the circuit elements of said first vertical column are then fed back into the processor for an analysis of the second hypothetical input vertical column to likewise determine whether there is a potential (binary 1), or the lack of a potential (binary 0), at the output of each circuit element of said second vertical column. This procedure continues until all of the hypothetical input vertical columns have been analyzed. The oututs of the last input vertical column to be analyzed are then utilized by the processor to analyze the output vertical column to determine which output or outputs should be energized or de-energized to thus operate the controlled machinery.

11 Claims, 14 Drawing Figures

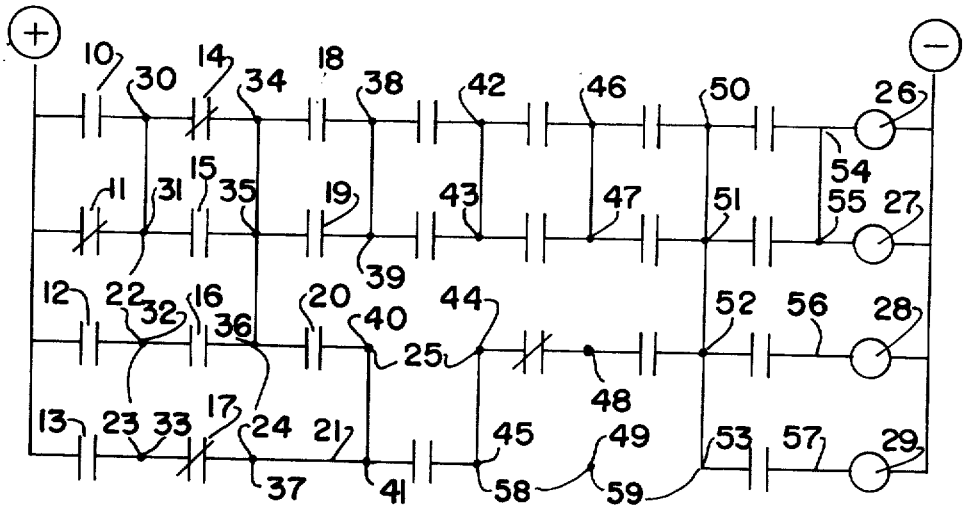
FIG. I
COLUMN |←1→|←2→|←3→|←4→|←5→|←6→|←7→|←8→|
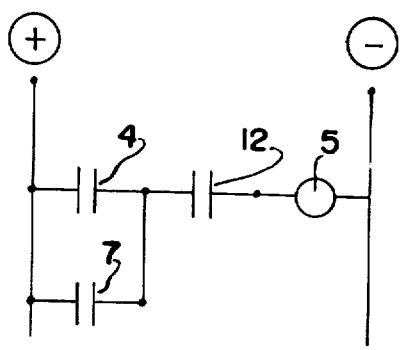
FIG. 2

FIG. 3
| | | |
|---|---|---|
| o   o | 10000 | I 16 |
| o   ⌀ | 10001 | I 17 |
| o—o | 10010 | I 18 |
| o—⌀ | 10011 | I 19 |
| o⊢⊢o | 10100 | I 20 |
| o⊢⊢⌀ | 10101 | I 21 |
| o⊬⊬o | 10110 | I 22 |
| o⊬⊬⌀ | 10111 | I 23 |
| —o— | 11000 | I 24 |
| —⌀— | 11001 | I 25 |
| PAGE | 11010 | I 26 |
| COLUMN | 11011 | I 27 |

FIG. 7
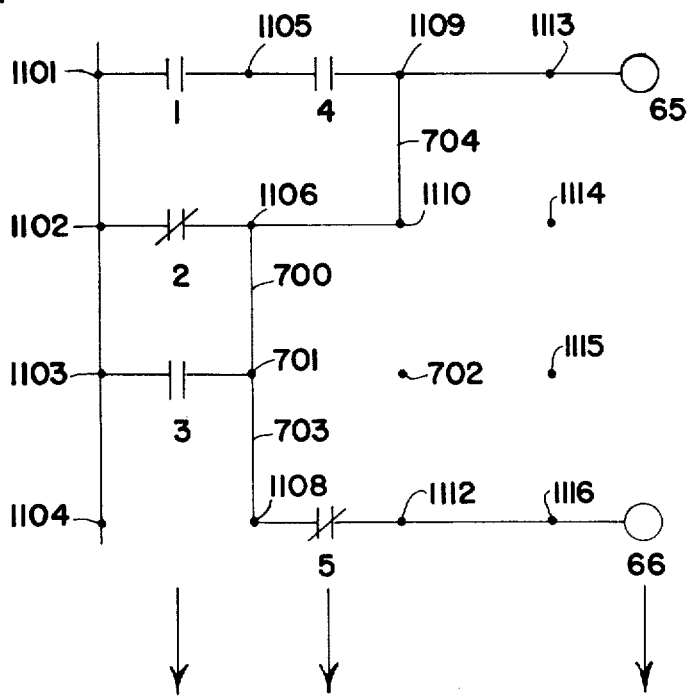
FIG. 12
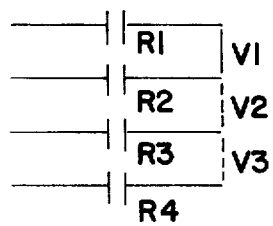
{ FIG. 8
| | COLUMN 1 | COLUMN 2 | | OUTPUT COLUMN | |
|---|---|---|---|---|---|
| PATTERN | A A | 9 B | | B0 | PATTERN |
| I/O ADDRESS: | 03 | 05 | | 09 | COMPLEMENT/PATTERN |
| I/O ADDRESS: | 02 | 04 | | 65 | OUTPUT ADDRESS |
| I/O ADDRESS: | 01 | | | 66 | OUTPUT ADDRESS |
| COMPLEMENT/VERTICAL | 46 | 58 | | FF | BEGINNING OF PAGE |
FIG. 11
| B7 | B6 | B5 | B4 | B3 | B2 | B1 | B0 |
|---|---|---|---|---|---|---|---|
| 0 | 1 | 0 | 0 | 1 | 0 | 0 | 0 |
FIG. 13
FIG. 14
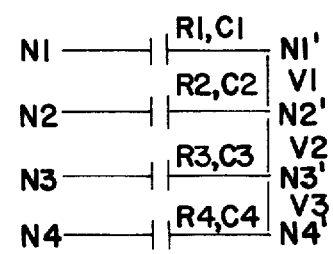
- •    •    NO ELEMENT (OPEN CIRCUIT)
- •——•    JUMPER (CONDUCTIVE LEFT-TO-RIGHT)
- —| |—    NORMALLY OPEN SWITCH (CONDUCTS WHEN ENERGIZED)
- —|/|—    NORMALLY CLOSED SWITCH (CONDUCTS WHEN DEENERGIZED)

FIG. 10

| NBR | PATTERN | CODE(HEX) | NBR | PATTERN | CODE(HEX) |
|---|---|---|---|---|---|
| 0 | ○  ○<br>○  ○<br>○  ○<br>○  ○ | 80 | 8 | o—∣∣—o<br>○  ○<br>○  ○<br>○  ○ | 98 |
| 1 | ○  ○<br>○  ○<br>○  ○<br>o—∣∣—o | 83 | 9 | o—∣∣—o<br>○  ○<br>○  ○<br>o—∣∣—o | 9B |
| 2 | ○  ○<br>○  ○<br>o—∣∣—o<br>○  ○ | 86 | 10 | o—∣∣—o<br>○  ○<br>o—∣∣—o<br>○  ○ | 9E |
| 3 | ○  ○<br>○  ○<br>o—∣∣—o<br>o—∣∣—o | 89 | 11 | o—∣∣—o<br>○  ○<br>o—∣∣—o<br>o—∣∣—o | A1 |
| 4 | ○  ○<br>o—∣∣—o<br>○  ○<br>○  ○ | 8C | 12 | o—∣∣—o<br>o—∣∣—o<br>○  ○<br>○  ○ | A4 |
| 5 | ○  ○<br>o—∣∣—o<br>○  ○<br>o—∣∣—o | 8F | 13 | o—∣∣—o<br>o—∣∣—o<br>○  ○<br>o—∣∣—o | A7 |
| 6 | ○  ○<br>o—∣∣—o<br>o—∣∣—o<br>○  ○ | 92 | 14 | o—∣∣—o<br>o—∣∣—o<br>o—∣∣—o<br>○  ○ | AA |
| 7 | ○  ○<br>o—∣∣—o<br>o—∣∣—o<br>o—∣∣—o | 95 | 15 | o—∣∣—o<br>o—∣∣—o<br>o—∣∣—o<br>o—∣∣—o | AD |

PROCESS CONTROL SYSTEM THAT CONTROLS ITS OUTPUTS ACCORDING TO THE RESULTS OF SUCCESSIVE ANALYSIS OF THE VERTICAL INPUT COLUMNS OF A HYPOTHETICAL LADDER DIAGRAM

BACKGROUND OF THE INVENTION

Years ago there were process controls in which each step of the process had one or more loads (such as motors or valves), controlled by an array of switches or relays. These switches and loads were connected together in the conventional fashion to achieve the desired result. A disadvantage resulted in that each switch or relay contact often had to carry the full current to the load; therefore, the apparatus had continuous problems especially as the equipment grew older.

More recently electronic process controls have replaced the earlier controls. Some of these electronic process controls have controlled the load or loads based upon an analysis of a hypothetical ladder diagram comprising the input switches (or other circuit elements) and the loads. The switches were connected to an input multiplexer, and the loads were connected to the outputs of an output multiplexer, and the electronic process control analyzed the hypothetical ladder diagram, received input information from the input multiplexer, and controlled the output multiplexer to achieve the desired control over the loads. Three such electronic process control systems are described in Chapter 2 of the doctorate thesis of co-inventor Alfred Charles Weaver entitled "A Graphically-Programmed, Microprocessor-Based Industrial Controller", submitted in partial fulfillment of the requirements for the degree of Doctor of Philosophy in Computer Science in the Graduate College of the University of Illinois at Urbana-Campaign, 1976, Urbana, Illinois. Moreover, one of these prior electronic processors is shown and described in U.S. Pat. No. 3,761,882 to Peter G. Bartlett, Donald E. Henry, and Thomas Murrell, entitled "Process Control Computer", dated Sept. 25, 1973.

However, the aforesaid prior machines leave something to be desired. They are too complex for many applications and industrial engineers have found difficulties in putting the same to use. Moreover, they are unduly expensive for many applications.

It is, therefore, an object of this invention to provide a process control system for solving a hypothetical ladder diagram that is lower in cost than those previously available.

Another object of the invention is to provide a process control system for solving a hypothetical ladder diagram that is simpler in construction than those previously available.

Still another object of the invention is to provide a process control system, capable of solving a hypothetical ladder diagram that is more reliable in operation than the prior ones.

Still another object of the invention is to provide a process control system that is simpler to put into use by persons unskilled in the technology involved.

SUMMARY OF THE INVENTION

A memory stores information representing a hypothetical ladder design of such design that if a real ladder diagram were constructed in accordance with the hypothetical one, the various input switches and other input circuit elements would control the load (or real world outputs) in the desired manner. The aforesaid hypothetical ladder diagram comprises a multiplicity of circuit elements, for example, switches, jumpers, and open circuits, arranged in a plurality of hypothetical horizontal rows. The same circuit elements also form a plurality of hypothetical vertical columns.

A processing unit analyzes the vertical columns of the hypothetical ladder diagram in a given sequence, with the output of the first hypothetical vertical column to be analyzed comprising the input of the second such vertical column, etc.

The analyzing means determines whether there is a potential (binary 1) or the lack of a potential (binary 0) at the output of each circuit element in the hypothetical input vertical column being analyzed. It uses that information as input information during its similar analysis of the next hypothetical vertical column whereby it determines whether the output of each circuit element of said next vertical column has a potential (binary 1), or the absence of a potential (binary 0), on it. After all of the vertical columns, containing inputs, have been analyzed as aforesaid, the output information of the last one of those columns is used as input information for an analysis of the output vertical column containing the loads (or real world outputs). The processor then controls the loads in accordance with a combination of (1) the information stored in the memory relevant to said output hypothetical vertical column, and (2) the potentials at the outputs of the elements of the last input hypothetical vertical columns to be analyzed.

With the invention the analysis of the plural vertical input columns of a single ladder results in separate signals each representing the output of separate horizontal rows. These signals may be separately stored and used to separately and independently control plural loads (real world outputs).

In the preferred form of the invention the results of the analysis of a vertical input column is stored and used as input to the next vertical input column.

In reading information out of the memories and the input multiplexer conventional addressing techniques are employed.

BRIEF DESCRIPTION OF THE DRAWINGS

FIG. 1 is a ladder diagram showing how particular circuit elements may control four separate loads. The circuit elements of the ladder diagram may be connected as shown, with wires, to the loads, to control them in the well-known conventional way. FIG. 1 also represents a hypothetical ladder diagram which is useful in explaining how the process control systems of this application may control the loads in accordance with the condition of the input switches, to achieve the same controlling action, although in an improved way, that was achieved by the real ladder diagram where the various parts are connected together by wires. FIG. 1 is the ladder diagram for the first step of the process hereinafter described.

FIG. 2 is a similar ladder diagram for the second step of the process hereinafter described.

FIG. 3 is a code of instructions applicable to one of the process control systems of this application.

FIG. 7 is a graphic hypothetical ladder diagram for use in explaining the preferred form of the invention.

FIG. 8 is a set of instructions for the first step of the process to be performed by the processor, in accordance with the preferred form of the invention.

FIG. 10 is a program involved in connection with the preferred form of the invention.

FIG. 11 comprises storage means used in explaining certain operations of the apparatus.

FIG. 12 is a part of a ladder diagram used in explaining the operation of the system.

FIG. 13 illustrates the four possible input elements of a ladder diagram.

FIG. 14 is a schematic view showing several elements of a vertical column in a form suitable for mathematical analysis.

DETAILED DESCRIPTION OF THE INVENTION

Figure 6:
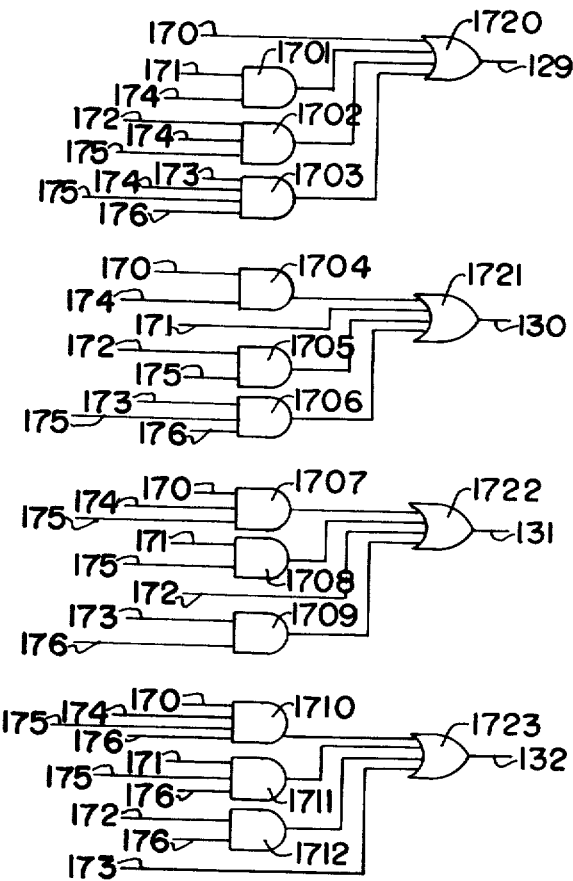
FIG. 6 is a block diagram of the contents of matrix 128 of FIG. 4.

As a matter of definition, the vertical columns which have input information are referred to as "input vertical columns". As applied to FIG. 1 this would be the first seven vertical columns. The words "output vertical column" includes the column containing the loads or outputs, these being, for example, elements 26 to 29 of FIG. 1.

The invention relates to a process control system for controlling the sequence of steps performed in connection with the carrying out of the process. The process may be almost any process which is controlled by a multiplicity of inputs and operates in a series of steps. As an example, assume an assembly line having say ten stations along the line at which ten different operations are performed. For the operation (or step) performed at each station, there are one or more inputs which, in one example, may determine if, when, and perhaps how, the operation will be performed. Each step of the process could, of course, be controlled as was the practice many years ago, by connecting the various switches and other circuit elements in a ladder arrangement, assuming that each circuit element was capable of carrying all the current required by the machinery being controlled. FIG. 1 is intended to ilustrate some of the possibilities involved in such a ladder. Elements 10 to 20 inclusive are switch contacts, typical of the many other switch contacts of the ladder. Switches such as 10, 12, 13, 15, 16, and 18 to 20 have normally open contacts which may close under predetermined conditions; and switches such as 11, 14, and 17 have normally closed contacts that open under predetermined conditions. The switches indicate different input factors such as whether the item of work is in proper position at the station for further processing, whether the temperature is within the proper range in order for the process to proceed, whether the system has adequate lubricating oil for the machinery involved, and whether there is an adequate supply of a particular raw material to carry out the process.

In connecting the various switches to develop the desired result, it is sometimes desirable to omit one or more vertical wires of the ladder, for example, see spaces 22, 23, 24, etc. Similarly, sometimes a horizontal wire is omitted, see space 25 for example. The outputs of the ladder of FIG. 1 comprise loads or machines 26 to 29 inclusive. Some or all of these four machines 26 to 29 may perform separate operations on the work product at the station of the assembly line complementary to FIG. 1. Whether any one or more of the machines 26 to 29 operates depends on the circuit of the ladder, and the on-off condition of the switches comprising the ladder, all of which is another way of saying that each of machines 26 to 29 will operate if and when they are connected to a source of power.

Clearly the apparatus of FIG. 1 could be wired, as shown, and the currents to the loads 26 to 29 sent directly through the various switches as shown. However, the present invention provides a much better way of achieving the desired result, and provides a way of controlling machinery for any given step of the process (in this example, the first station on the assembly line). It provides apparatus for controlling each step of the process according to its individual ladder.

In accordance with the invention the various switches such as 10 to 20 are not electrically connected to each other as shown in FIG. 1. Instead, a hypothetical ladder diagram, such as that shown in FIG. 1, is prepared on paper and each switch (or other circuit element, including an open circuit) is designated by a code representing the switch and whether its normal condition is off or on. We will next describe a suitable binary code as shown in FIG. 3. The code may be composed of two binary words. For purposes of illustration we may assume that each word has only five digits, although it is understood that as many digits as necessary would be used. The first word of five digits represents the switch (or other circuit element, including an open circuit) and its condition; and the second word of five digits identifies the switch or circuit element by number.

For example, the binary representation for switch 10 is:

10101 01010

This is explained as follows: The code of FIG. 3 shows that a normally open switch with a vertical output to the next lower level of the ladder is identified by Instruction I-21 and by code 10101. Therefore, those five digits were the first five digits for the identification of the switch. Since the switch will be arbitrarily designated in the system as switch 10, the second of the two binary words is decimal 10 or binary 01010.

We will next state the ten digit binary codes for the switches in the first two vertical columns of the hypothetical ladder:

TABLE A

| | INSTRUCTION | ADDRESS | INSTRUCTION NUMBER |
|---|---|---|---|
| 1. | 11010 | | I-26 |
| 2. | 10101 | 01010 | I-21 |
| 3. | 10110 | 01011 | I-22 |
| 4. | 10100 | 01100 | I-20 |
| 5. | 10100 | 01101 | I-20 |
| 6. | 11011 | | I-27 |
| 7. | 10111 | 01110 | I-23 |
| 8. | 10101 | 01111 | I-21 |
| 9. | 10100 | 10000 | I-20 |
| 10. | 10110 | 10001 | I-22 |
| 11. | 11011 | | I-27 |

We started the above series of numbers with instruction I-26 to indicate the start of a page. Each step of the process begins with a new "page"; however, if the step is complex, it may employ several "pages".

Instructions 2 to 5 inclusive on the above list represent the four switches 10, 11, 12 and 13 of vertical column 1 of the ladder.

The sixth instruction I-27 is the "end of column" instruction.

The seventh to tenth, inclusive, instructions represent switches 14, 15, 16 and 17 respectively comprising vertical column 2 of the ladder.

The eleventh instruction is the "end of column" instruction I-27 and represents the end of column 2.

If the list of binary instructions was complete, the instructions in Table A would be followed by the binary numbers representing the four switches in column 3 followed by the end of colum instruction I-27; this being repeated for columns 4 to 8 inclusive in that order.

Space 25 represents the absence of a switch followed by a vertical path and, therefore, instruction I-17 applies. Reference numbers 58 and 59 represent open circuits not followed by vertical paths. Hence instructions I-16 applies to both.

After the first page of instructions has been composed for the first step of the process, a second page is composed for the second step.

If we assume that a hypothetical ladder conforming to FIG. 1 represents the first step of the process, and FIG. 2 represents the hypothetical ladder for the second step of the process, the following program would be the program for the second step of the process:

TABLE B

| INSTRUCTION | ADDRESS | |
|---|---|---|
| 11010 | | I-26 |
| 10101 | 00100 | I-21 |
| 10100 | 00111 | I-20 |
| 11011 | | I-27 |
| 10100 | 01100 | I-20 |
| 11011 | | I-27 |
| 11000 | 00101 | I-24 |
| 11011 | | I-27 |

After the programs for all steps of the process have been composed they are placed in sequence one after the next with the same spacing between each instruction of the program.

When the entire set of instructions has been prepared it is entered in memory 100 which is composed of two parts (see FIG. 4), an instruction portion 101 and an address portion 102. The memory has associated with it means which at a rapid rate (for example, one ten digit set of signals every few microseconds) repeats the entire sequence of instructions (beginning with the first word of page 1 and ending with the last page) over and over again until the process has been completely carried out. A suitable memory together with means for reading it over and over again is disclosed in said U.S. Pat. No. 3,881,172, entitled "Process Control Computer". As the first five digits of each line of instructions are read the five digits are respectively applied to wires 103 to 107 respectively. When the line of instructions is accompanied by a second group of five binary digits (such as 01010 representing switch 10), the address portion 102 of memory 100, acting through conventional multiplexer 109, senses the condition of a switch (such as switch 10) and feeds its condition (open or closed) into wire 108. The inputs to the input multiplexer 109 are known as "real world" inputs.

Thus, at any moment other than when a page or column instruction is being read out of the memory, there is fed into the wires 103 to 107 the five digits representing the normal condition of the switch (or wire, or lack of a wire, etc., as the case may be). At the same moment there is being fed into wire 108 the condition (open or closed) of that switch.

Assume the case where one of the inputs to the input multiplexer 109 is an open horizontal circuit, such as 25 of FIG. 1. In that case, there is no address associated with instruction I-17, and the condition of wire 108 is not used to generate the proper signal on wire 112. As will appear later, the programmable logic array 160 provides no signal (binary 0) on wire 112 whenever either instruction I16 or instruction I-17 is read out of the memory. Similarly if we assume the case where there is a firm connection across a horizontal part of the ladder such as at 21, a binary 1 is fed onto wire 112 without reference to the condition of wire 108.

The input and output multiplexers 109 and 143 are conventional, and similar apparatus has been widely used in process control systems of the prior art, for example see said U.S. Pat. No. 3,881,772, elements 25 and 70.

The programmable logic array 160 is an array of "AND" and "OR" gates that receives instructions along wires 103 to 107, input data from input multiplexer 109 along wire 108, and additional input from multiplexer 140 along wire 141, and provides output signals.

Figure 4:
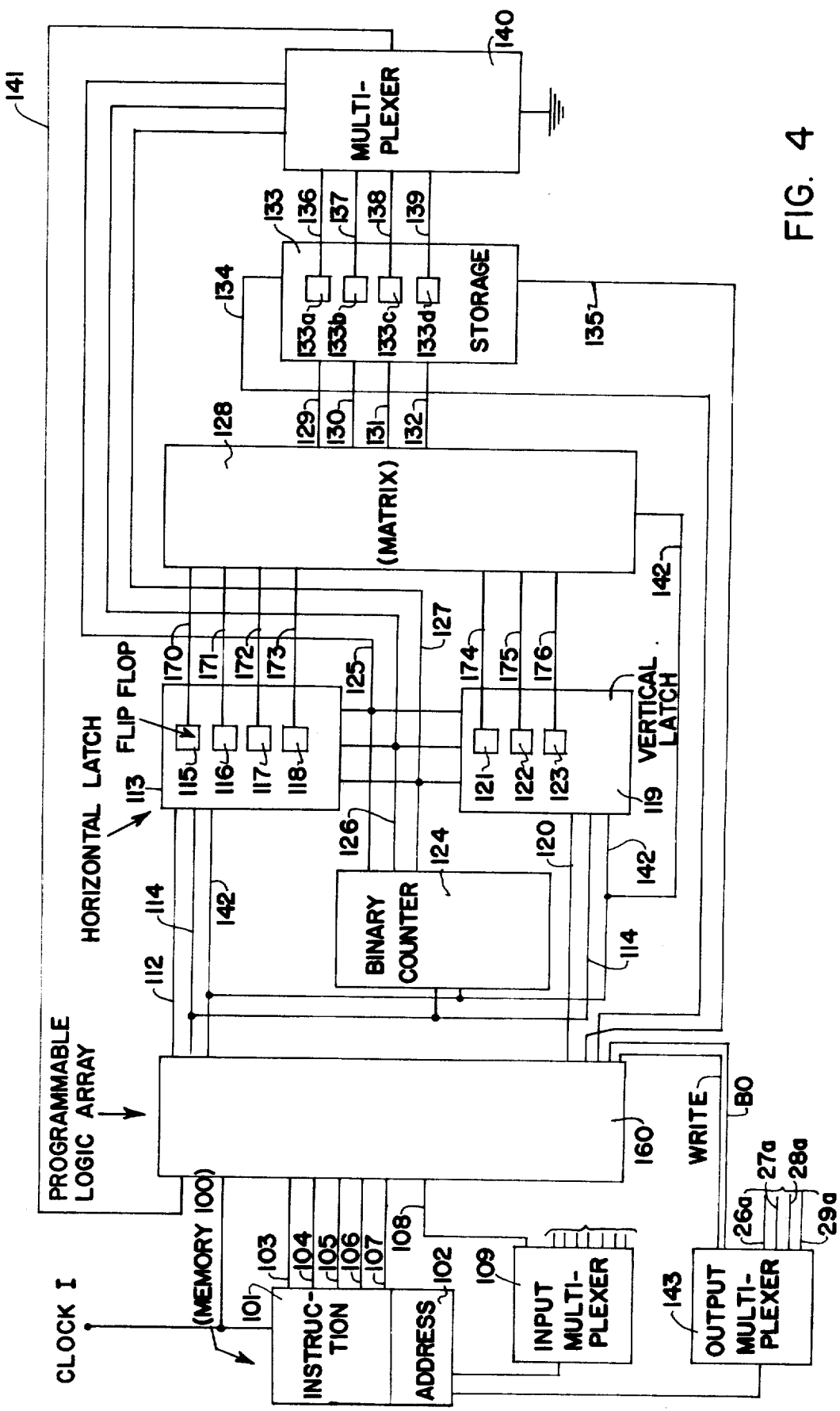
FIG. 4 is a block diagram of one of the process control systems of this application.

A data signal (binary 1) appears on wire 112 whenever a switch or other circuit element of the hypothetical ladder of FIG. 1, has a potential (binary 1) on its output; for example, if when switch 10 of the hypothetical ladder is scanned the process control system of FIG. 4 concludes that there would be a real potential (binary 1) on the output wire of switch 10 of a real ladder; it will conclude that there is a hypothetical potential (binary 1) on the output node 30 of the hypothetical ladder diagram and a signal will appear on wire 112.

The programmable logic array 160 emits a signal on wire 120 each time the fifth digit of the program instruction (other than page, column and output instructions) is a binary 1; that is each time one of instructions I-17, I-19, I-21 or I-23 (FIG. 3) is given, a signal will appear on wire 120. It is noted that these instructions each relate to a switch which, in the hypothetical ladder diagram, has a downwardly extending vertical wire on its output; hence, every time a switch or other circuit element (including an open circuit) is scanned that, in the hypothetical ladder diagram, has a downwardly extending vertical wire on its output, a signal will appear on wire 120.

Figure 5:
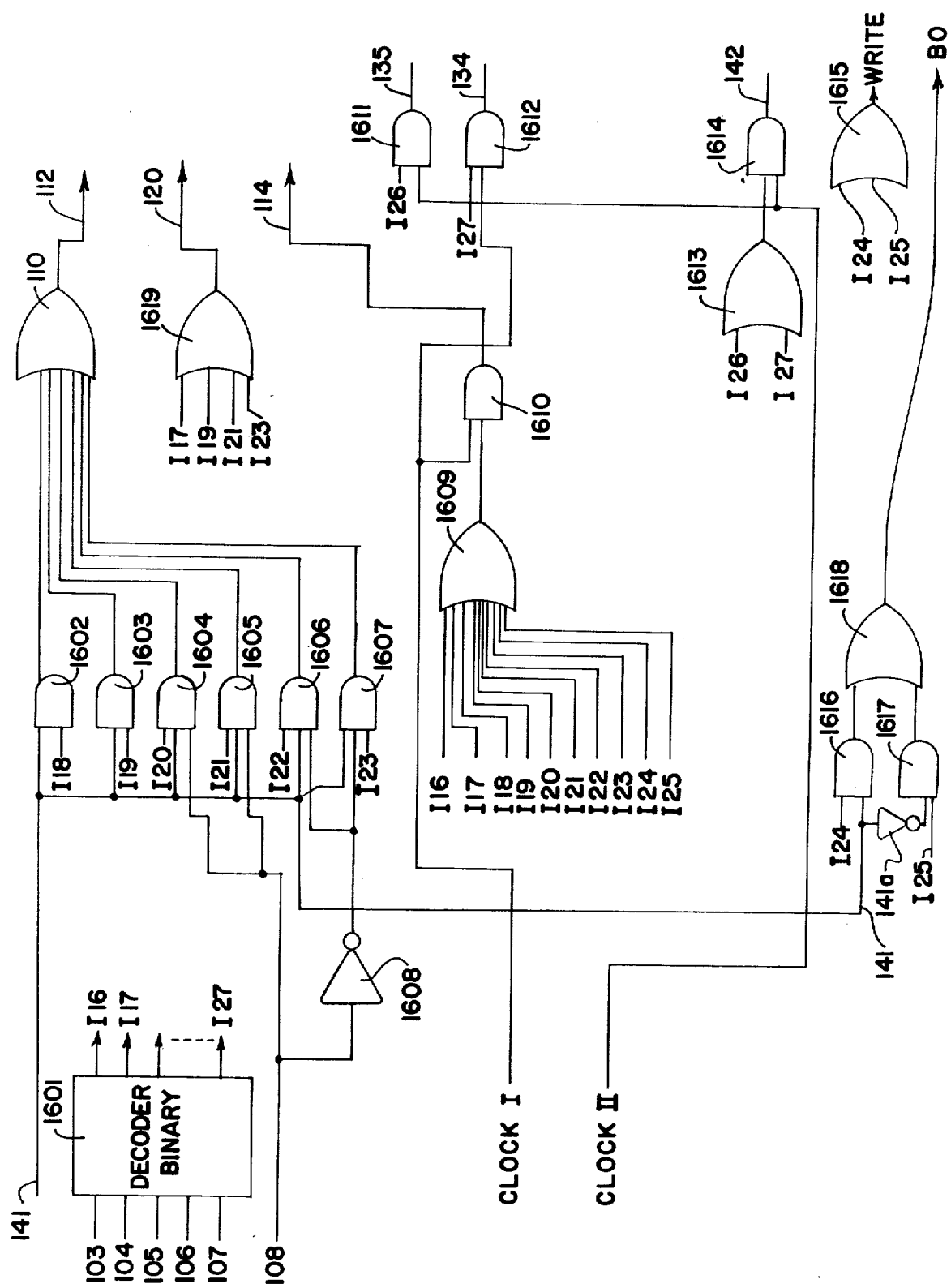
FIG. 5 is a schematic diagram of the programmable logic array 160 of FIG. 4.

The construction and mode of operation of Programmable Logic Array 160 will now be explained by reference to FIG. 5. Incoming lines 103, 104, 105, 106 and 107 from memory 101 carry the five binary digits of the instruction. In other words the five binary digits of each word under the heading "INSTRUCTION" of Tables A and B appear respectively on these lines 103 to 107 inclusive. The five digit binary words appearing on wires 103 to 107 inclusive are decoded by binary decoder which has output lines I-16 to I-27 inclusive. Therefore, whenever the binary input word represents a given instruction, as shown in FIG. 3, a signal is produced on the particular output line I-16 to I-27 that represents that instruction. These signals which appear at the output of decoder 1601 are fed to the inputs of various other parts of FIG. 5 as will appear as this description proceeds.

Instructions I-18 and I-19 represent jumpers, that is, firm horizontal connections of the hypothetical ladder. They are decoded by decoder 1601 and respectively are inputs to AND gates 1602 and 1063. The other wire entering these AND gates 1602 and 1603 is wire 141 which, as will appear later, has a signal on it when there is a potential (binary 1) on the input of a given circuit element. Thus, taking the case of jumper 21 of the hypothetical ladder of FIG. 1, there will be a signal on wire 141 when the instruction for jumper 21 is read, provided that there is a hypothetical potential (binary 1) at mode 37 of the hypothetical ladder diagram of FIG. 1.

Instructions I-20 and I-21 represent switches with normally open contacts (see FIG. 3). Signals from decoder 1601 representing these two instructions respectively enter "AND" gates 1604 and 1605 respectively.

In addition to the wire carrying instruction I-21, wires 108 and 141 also enter "AND" gate 1605, and, therefore, there will be a signal on the output of this gate only if there is a hypothetical potential (binary 1) on the input of a normally open switch (that has a downwardly extending wire at its output), a condition which is reflected by a pulse on wire 141, in addition to a signal on wire 108 representing that the switch is closed, together with a signal on wire 141 representing that there is a potential (binary 1) at the input of the switch.

Instructions I-22 and I-23 represent normally closed switches, see FIG. 1. The wires carrying these instructions enter AND gates 1606 and 1607 respectively. In addition, wire 141 enters both of these gates along with a signal from input wire 108 after that signal has passed through inverter 1608.

There will be a signal on the output of gate 1606 only if there is a hypothetical potential (binary 1) on the input of a normally closed switch (that does not have a downwardly extending wire at its output), in addition to a signal (binary 0) on wire 108 representing that the switch has not been opened, together with a signal on wire 141 representing that there is a hypothetical potential (binary 1) at the input of the switch.

There will be a signal on the output of gate 1607 only if there is a hypothetical potential (binary 1) on the input of a normally closed switch (that has a downwardly extending wire at its output), in addition to a signal (binary 0) on wire 108 representing that the switch has not been opened, together with a signal on wire 141 representing that there is a hypothetical potential (binary 1) at the input of the switch.

The outputs of AND gates 1602 to 1607 are inputs to OR gate 110 which produces a signal on wire 112 (which as shown in FIG. 4 is an input to horizontal latch 113) in event that any one of gates 1602 to 1607 has an output signal.

Wires carrying instructions I-17, I-19, I-21 and I-23 are inputs to OR gate 1619, whereby there is a signal on wire 120 in response to any one of instructions I-17, I-19, I-21 or I-23 (the instructions representing circuit elements having a downwardly extending output wire). Hence, whenever one of these circuit elements is scanned in the hypothetical ladder, a signal appears on wire 120. This wire is an input to vetical latch 119 as will appear (see FIG. 4).

As will apear, the system employs a signal on wire 114 to "set" the horizontal and vertical latches 113 and 119, and to provide the binary counter 124 with signals to be counted. The signals on wire 114 are generated as follows. Wires from decorder 1601 representing all of Instructions I-16 to I-25 enter OR gate 1609. When gate 1609 has an output resulting from any of instructions I-16 to I-25, together with a pulse from Clock I, a signal passes AND gate 1610 to wire 114.

The system also employs a signal on wire 134 to clear storage element 133 (see FIG. 4) and to cause a new set of data to be stored in that element 133. The AND gate 1612 receives a wire I-27 from decoder 1601 carrying a signal whenever instruction I-27 is read out of the memory 101. The other input to AND gate 1612 is from Clock I. Thus, when both inputs to gate 1612 are energized, a signal appears on wire 134 for a function explained more fully hereinafter.

The system employs a signal on wire 135 to turn each of the four flip-flops comprising storage 133 to their "on" condition at the start of a page of instructions. The reason for this is that at the left end of the hypothetical ladder (FIG. 1) there is a hypothetical potential representing + which enters the input side of each of the circuit elements of the ladder. Thus, to show that each of the circuit elements of the hypothetical first vertical column have a hypothetical potential thereon, signals should appear at each of the outputs 136, 137, 138 and 139 of storage element 133, as will be explained fully hereinafter.

Therefore, AND gate 1611 receives an input signal from Clock II. It also has an input I-26 representing the fact that a wire I-26 from the output of decoder 1601 passes to the input of AND gate 1611 and carries a signal to that gate whenever instruction I-26 is read out of memory 101. Thus, when a Clock II pulse occurs concurrently with Instruction I-26, a pulse appears on wire 135.

A signal on wire 142 is employed to reset all the flip-flops of horizontal and vertical latches 113 and 119, and to reset binary counter 124 to zero. The signal is produced on wire 142 as follows. The OR gate 1613 has wires I-26 and I-27 as inputs, these wires coming from the output of decoder 1601. Thus, if signals representing either instruction I-26 or instruction I-27 are read out of memory 101, a signal will pass through OR gate 1613 to an input of AND gate 1614. The other input to AND gate 1614 is from Clock II. The result is a signal on wire 142 whenever either of instructions I-26 or I-27 is read out of memory 101 at the time a pulse from Clock II appears.

The outputs or loads are represented in FIG. 1 by reference numbers 26, 27, 28 and 29, and in FIG. 3 by instructions I-24 and I-25. When either of these instructions are read out of memory 101, a signal passes from decoder 1601 to OR gate 1615, to produce the "Write" signal to be discussed later.

An output signal $B_o$ which is an input to the output multiplexer 143 (see FIG. 4) is produced as follows. Wire 141 comprises one input to AND gate 1616 and the complement of the signal on wire 141 comprises one input to AND gate 1617. The other input I-24 to AND gate 1616 comes from decoder 1601 and provides a signal to gate 1616 whenever Instruction I-24 is read out of memory 101. Similarly an input I-25 to AND gate 1617 comes from decoder 1601 and feeds a signal to gate 1617 whenever Instruction I-25 is read out of memory 101. The outputs of AND gates 1616 and 1617 are inputs to OR gate 1618, the output of which is $B_o$.

Pulses from Clock I occur at the same rate that instructions are read out of memory 101; indeed, such pulses control the reading of an instruction plus address out of memory 100.

Pulses from Clock II occur at the same repetitious rate as pulses from Clock I but lag slightly behind those from Clock I.

The binary counter 124 is normally set at zero and counts up by one binary number for each pulse on wire 114. It must have a maximum count capacity equal to or greater than the number of horizontal lines of the ladder of FIG. 1. It has three outputs 125, 126 and 127 representing binary numbers 4, 2 and 1, allowing the counter to count to binary 7, but the number of binary outputs can be increased or decreased to accommodate the maximum capacity of the process control system.

The horizontal and vertical latches 113 and 119 are conventional items of electronic hardware. One such suitable device is the Am 93L08, Low-Power Dual Four Bit Latch, manufactured by Advanced Micro Devices, Inc., 901 Thompson Place, Sunnyvale, California.

The horizontal latch 113 comprises a series of flip-flops 115 to 118 inclusive. There should be at least as many flip-flops as the maximum number of horizontal lines of the ladder of FIG. 1. Each flip-flop at any instant of time represents the potential on the output of one element of the hypothetical ladder. The flip-flops are normally "off" and are rendered such prior to each instruction set (or group) representing a new column by the reset pulse entering on wire 142.

The horizontal latch 113 also receives the output of the binary counter 124 on wires 125, 126 and 127. To enable the first data signal to be received by horizontal latch 113, there is a clock pulse on wire 114 which conditions the horizontal latch 113 to receive the pulse on wire 114 which conditions the horizontal latch 113 to receive the data signal. The same clock pulse advances the binary counter 124, with the effect that when the count on wires 125, 126 and 127 is binary 1, the data signal on wire 112 is communicated to flip-flop 115. If the data signal is a binary zero, flip-flop 115 remains "off". The next clock pulse on wire 114 steps the binary counter 124 to binary 2 and conditions the horizontal latch 113 to respond to the next signal to appear on data wire 112. The count of binary 2 causes the data wire 112 to communicate with flip-flop 116.

In like manner each clock pulse advances the horizontal latch 113 one step and permits the next flip-flop 117 or 118, as the case may be, to receive, and be set by (if binary 1 is received) a signal on wire 112.

In like manner each pulse on wire 114 advances the horizontal column of the hypothetical ladder of FIG. 1, the four flip-flops 115, 116, 117 and 118 respectively represent the hypothetical condition of the four points 30, 31, 32 and 33 of the hypothetical ladder of FIG. 1; that is, if any one of those points has a potential (binary 1) on it, its corresponding flip-flop (115 to 118) is "on"; otherwise, the flip-flop is "off".

The vertical latch 119 is similar in construction to the horizontal latch 113, the main difference being that it has one less output wire. There are three flip-flops 121, 122 and 123. As the first switch 10 of the first horizontal line of the hypothetical ladder (FIG. 1) is scanned, the fifth digit of the instruction (I-21) indicates that there is a downwardly extending wire at the output of switch 10. Since this fifth digit, in this case, is a binary 1, it will turn switch 121 "on" after the Clock I pulse on wire 114 has advanced the binary counter 124 to select flip-flop 121 and has conditioned the vertical latch 119 to receive. The next pulse on wire 114 advances the binary counter 124 to select flip-flop 122 and conditions the vertical latch 119 to receive. If, as in this case, the next signal on wire 120 is a binary 0, flip-flop 122 will remain "off". Similary, after the next pulse on wire 114 advances the binary counter 124 to select flip-flop 123 and conditions the vertical latch 119 to receive, switch 12 is scanned, and since its output also does not have a downwardly extending wire, the flip-flop 123 will remain "off".

Thus, whenever a switch of the hypothetical ladder (FIG. 1) does not have a downwardly extending wire at its output, the corresponding flip-flop (121 to 123) will remain "off".

The matrix 128 receives the outputs of flip-flops 115 to 118 and 121 to 123. After the instructions representing any given hypothetical vertical column have been read out of memory 101, the conditions of the four hypothetical outputs of the four switches (or other circuit elements), comprising that vertical column, are represented by the four flip-flops 115 to 118 respectively (this, however, neglects whether there is a hypothetical vertical wire at the output of the switch); and the presence (or absence) of hypothetical vertical wires between hypothetical horizontal lines is indicated by flip-flops 121 to 123.

Thus, complete information on the hypothetical vertical column of the hypothetical ladder (FIG. 1) which was just scanned appears at the input of matrix 128.

The matrix 128 combines the input information on wires 170 to 176 from flip-flops 115 to 118 and 121 to 123 to produce output information on wires 129 to 132. The output information on these four wires 129, 130, 131 and 132 respectively represents the condition of the four output points of the hypothetical vertical column just scanned. That is, after the scanning of the first hypothetical vertical column of FIG. 1, there will be a potential on wire 129 if there is a hypothetical potential at hypothetical point 30 of FIG. 1; but no potential will appear on wire 129 if no hypothetical potential exists at hypothetical point 30. Similarly, a potential (or absence of a potential) on wires 130, 131 and 132 respectively represent whether or not there is a potential (or absence of a potential) on hypothetical points 31, 32 and 33. Thus, the output of a complete hypothetical vertical column appears at the input to storage 133.

FIG. 6 illustrates the internal construction of matrix 128. As previously explained, there will be a potential on wire 129 if there is a hypothetical potential at point 30 of FIG. 1. This will occur if any one or more of the following four conditions is true: (a) if switch 10 is closed, (b) if switch 11 is closed and a vertical wire exists between points 30 and 31, (c) if switch 12 is closed and vertical wires exist between points 30 and 31 and between points 31 and 32, or (d) if switch 13 is closed and all three vertical wires exist, between 30 and 31, between 31 and 32, and between 32 and 33.

These four conditions, or possible conduction paths, correspond to the four inputs to OR gate 1720. Wire 170 will have a potential if switch 10 is closed. A potential on wire 171 corresponds to switch 11 being closed, and a potential on wire 174 corresponds to the existence of a vertical wire between points 30 and 31. Wires 171 and 174 comprise inputs to AND gate 1701, which will show a potential on its output only if both inputs carry potentials. In a similar way, the output of AND gate 1702 will carry a potential only if switch 12 is closed and vertical wires exist between points 30 and 31 and between points 31 and 32. The output of AND gate 1703 will carry a potential only if switch 13 is closed and all three vertical wires exist. Finally, the output of OR gate 1720 will carry a potential if any one or more of its inputs carries a potential.

In similar fashion, the outputs of OR gates 1721, 1722, and 1723 correspond to the existence of hypothetical potentials at points 31, 32, and 33 of FIG. 1.

Storage 133 receives the output of each hypothetical vertical column and stores it while the next hypothetical vertical column is scanned.

After the next vertical column is scanned, flip-flops 133a, 133b, 133c, 133d are cleared by the signal on wire 134 to receive and store the signals on wires 129–132 representing the outputs of the four points of the vertical column most recently analyzed.

The conventional multiplexer 140 processes the signals on wires 136–139. Those signals represent the outputs of one hypothetical vertical column and are processed by multiplexer 140 during the analysis of the next hypothetical vertical column.

The multiplexer 140 receives the output of the binary counter 124 on wires 125, 126 and 127. At the count of binary 1 (of counter 124) the presence or absence of a potential on wire 136 is communicated to wire 141. Similarly, at binary counts 2, 3 and 4 the presence or absence of a potential on wires 137 to 139 are successively communicated to wire 141, respectively.

When the series of instructions I-26, I-21, I-22, I-20, etc., as set forth in Table A of this specification is read by the memory 100 for the purpose of starting the process controller in operation, the "beginning of page" instruction I-26 is routed by instruction memory 101 to gate 1611 (see FIG. 5) to apply a signal via wire 135 to storage element 133 to turn all of its flip-flops "on", and this supplies a signal on wire 141 which passes gate 110, to wire 112, each time that a circuit element of the first hypothetical vertical column is analyzed and found to provide a through connection to the node of the output of that element. The setting of all of the flip-flops of storage 133 to their "on" positions, in response to the beginning of page instruction I-26, is a way of advising the process control system that all of the circuit elements 10, 11, 12 and 13 are connected at their left ends to the positive side of the power line.

We will next discuss the operation of the process control system assuming that memory 100 contains the instructions set forth in Tables A and B.

The first instruction (I-26) of Table A places a potential via gate 1611, on wire 135. This sets all the flip-flops of storage 133 to their "on" positions and places binary 1 potentials on wire 141 during the processing of the next four instructions.

As the instructions in Table A are read, the "address" portion of the instructions are fed to input multiplexer 109 which sequentially senses the various switches in the hypothetical ladder (such as FIG. 1). In other words the first switch to be sensed is switch 10. Since the instruction corresponding to switch 10 is I-21, a binary 1 will be applied to one input of AND gate 1605. Since there is a signal on wire 141 (resulting from signals on wires 138 and 139), a second input of gate 1605 will also have a binary 1 placed on it. If switch 10 is closed then a signal is emitted on wire 108 (to so indicate that closure) to a third input of gate 1605, resulting in a binary 1 on one input of OR gate 110, and consequently a binary 1 signal on wire 112 which is the data input wire to horizontal latch 113. During the period when such signal on wire 112 is present, there would also be present a clock pulse on wire 114, and the concurrent presence of two signals on wires 112 and 114 will set flip-flop 115 to its "on" position. If, however, switch 10 remained open there would be binary 0 on wires 108 and 112 and flip-flop 115 would remain in its "off" position. After the instruction representing the switch 10 has been processed as aforesaid, the memory 100 next provides the processor with the instruction and address for switch 11. During this period wire 141 is producing a signal to the inputs of AND gates 1602 to 1607, inclusive, because switch 11 is in the first vertical column. Since instruction I-22 corresponds to switch 11, a signal will be produced on a second input of gate 1606. If the multiplexer 109 on receiving the address of switch 11 finds that it has not been opened, a binary 0 on wire 108 will pass through inverter 1608, producing a binary 1 on a third input of gate 1606 with the result that a signal will be produced on wire 112 that will set flip-flop 116 in the "on" position, it being noted that there would be a concurrent clock pulse on wire 114 which is necessary in the case of each flip-flop if it is to be set to its "on" position. In like manner, the switches 12 and 13 are sensed in proper sequence and if they are "on", their respective flip-flop 117 and 118 will be turned "on", but if either of those switches is open, the respective flip-flop will not be turned "on".

At the same time that the instructions on Table A are being applied to horizontal latch 113, there may be signals applied to vertical latch 119. Each time that the "instruction" program of Table A identifies one of instructions I-17, I-19, I-21 and I-23, a signal is fed on wire 120 to vertical latch 119. It is noted that each of the aforesaid four instructions I-17, I-19, I-21 and I-23 represent a configuration terminating at its righthand end in a vertical wire which extends downwardly to the "row" below it. It is noted that each one of these four instructions terminates in a binary 1 and, therefore, whenever one of these instructions occurs, after a page instruction I-26 and prior to a column instruction I-27, or between two column instructions I-27, the binary 1 on wire 107 creates a binary 1 on wire 120. There are three flip-flops 121, 122 and 123 which comprise the vertical latch 119. These three flip-flops are selected in sequence by the signals from binary counter 124 via wires 125, 126 and 127. The binary counter begins to count with the first instruction following the page instruction I-26 (see Table A) and counts to 4. All four counts are used by horizontal latch 113 but only the first three are used by vertical latch 119. At the count of 1, the first flip-flop 121 is "turned on" if there is a hypothetical connection between the top horizontal wire of the hypothetical ladder and the second horizontal wire, namely, between points 30 and 31 of FIG. 1. Since there is such a hypothetical wire, the flip-flop 121 will be turned "on" when instruction I-21 is read out of the memory. Since there is no connection between points 31 and 32, or between points 32 and 33, when the instructions I-22 and I-20 of Table A are read out of the memory, to represent switches 11 and 12, there will be no signal on wire 120 and the flip-flops 122 and 123 will remain "off".

When the memory reaches the sixth instruction I-27, representing the end of the first vertical column, a pulse will appear on wire 134, which will reset all of the flip-flops of storage 133 to their "off" positions, thus conditioning storage 133 to receive new signals.

Since the flip-flops 115 to 118 now respectively indicate the presence or absence of conduction paths through switches 10, 11, 12 and 13, and since flip-flops 121, 122 and 123 indicate the presence or absence of wires respectively between 30-31, 31-32, and 32-33, the matrix 128 has all of the information pertaining to the output of the hypothetical first vertical column comprising switches 10 to 13 inclusive, together with all vertical connections associated with these switches. It takes the input information from flip-flops 115-118 and 121-123 and combines them together to indicate on the four wires 129, 130, 131 and 132 the presence or absence of signals at points 30, 31, 32 and 33 of the hypothetical ladder of FIG. 1. These four signals enter storage element 133. Upon the receipt of an "end of column" instruction I-27, a pulse appears on wire 134 which first clears the storage element 133 as previously described, and then stores the signals then existing on wires 129, 130, 131 and 132 in the storage element 133. Therefore, the four output leads 136, 137, 138 and 139 of storage element 133 represent whether or not there are hypothetical potentials (binary 1 signals) at points 30, 31, 32 and 33 respectively of the hypothetical ladder of FIG. 1.

Concurrently with the "end of column" instruction I-27, there is also produced a reset signal on wire 142 which resets the flip-flops 115 to 118, and 121 to 123, to their "off" positions, and resets binary counter 124 to zero.

Thereafter, the seventh instruction I-23 of Table A (representing switch 14) is read out of the memory 100. At the same time, the counter 124 counts to 1 and via wire 125 conditions the multiplexer 140 to send out one of the signals applied thereto namely, the signal on wire 136. If there is a binary 1 on wire 136 at the aforesaid first count, a pulse will appear on wire 141 which is fed into an input of AND gate 1606 along with any inverted signal that may be appearing at the same time on the output of inverter 1608. Whether a signal is appearing at the output of inverter 1608 at this time depends on whether switch 14 is open or closed. If it is closed, and if there is a pulse on wire 141, the gates 1606 and 110 will feed a signal to wire 112 and set flip-flop 115 to the "on" position, but in the absence of signals at all of the inputs of gate 1606, the flip-flop 115 will remain in its "off" position.

In like manner to the way that the second, third and fourth instructions of Table A were processed, the fifth to eighth instructions of Table A will be processed, the only procedural difference being that signals on wire 141 will be supplied from the signals stored in storage 133 as a result of the scanning of the first hypothetical vertical column instead of the signals produced in storage 133 as a result of a signal on wire 135. Therefore, the setting of flip-flop 115 will depend on whether there is a pulse on wire 141 concurrently with a pulse at the output of inverter 1608, at the time that the instruction representing switch 14 is processed. Similarly, whether flip-flop 116 is set to its "on" position or not depends on the presence or absence of signals on both wires 141 and 108 at the time that the instruction representing switch 15 is processed.

Furthermore, during the processing of the instruction for the second hypothetical vertical column of FIG. 1, the flip-flops 121 and 122 would be set to their "on" positions by the seventh and eighth instructions representing I-23 and I-21, but flip-flop 123 would remain in its "off" position since there is no connection between points 36 and 37 of FIG. 1.

Consequently, after all of the instructions (set forth in Table A) for the second vertical column have been processed, there will appear in the matrix 128 the information contained in flip-flops 115 to 118 and 121 to 123, and the four outputs 129, 130, 131 and 132 of matrix 128 will respectively indicate the presence or absence of a potential (binary 1 or binary 0) at points 34, 35, 36 and 37. The potentials at points 34, 35, 36 and 37 will be fed to the input of the storage element 133 and will be held there (following a pulse on wire 134) so that they may be fed out by multiplexer 140, onto wire 141, during the analysis of the third hypothetical vertical column of FIG. 1. In like manner to the analysis of the first two vertical columns, the third to seventh vertical columns of FIG. 1 are analyzed in sequence. After the seventh vertical column is analyzed, there will be a potential (binary 1) or the lack of potential (binary 0) on each of wires 136, 137, 138 and 139 representing the condition (potential) at points 54, 55, 56 and 57.

After the first seven hypothetical columns have been analyzed, hypothetical output column 8 is analyzed. This begins at the time that the instruction representing load 26 is read and produces a potential on wire $B_o$ if there was a hypothetical potential at hypothetical point 54 (FIG. 1). The signal on wire 141 then passes either gate 1616 or inverter 141a and gate 1617, and then passes gate 1618 to wire $B_o$. This potential on wire $B_o$ will be fed to output multiplexer 143. The output multiplexer may also receive the "Write" signal to condition it to receive any signal on wire $B_o$ (FIG. 4 and 6). The output multiplexer then utilizes the signal on wire $B_o$ to energize wire 26a leading to load 26 to reflect the fact that there was a potential on wire $B_o$ at the time that Instruction I-24 representing load 26 was read out of memory 101. Similarly, if there is a potential at point 55 at the time that Instruction I-24 representing load 27 is read out of memory 101, a potential will appear on wire $B_o$ which will be routed to output multiplexer 142 onto wire 27a to feed the load 27. Similarly, when Instruction I-24 representing load 28 is read out of memory 101, a potential will appear on wire $B_o$ which will be routed to output multiplexer 143 to energize wire 28a, if there was a potential on wire 56. Similarly, at the time Instruction I-24 representing load 29 is read out of memory 101, if there was a potential at point 57, a potential will appear on wire $B_o$ that will be fed to output multiplexer 142 to energize wire 29a and the load 29. The outputs 26a to 29a are "real world" outputs.

Thus, the several loads 26 to 29 will be energized by the process control system if the conditions, switches and other circuit elements of the ladder call for such energization.

It may be that during the scanning of the hypothetical ladder diagram of FIG. 1, as described in connection with Table A, that one of the switches, which must be turned "on" in order for the process to proceed has not yet closed. For example, there may be a switch which does not close until some prerequisite condition for the performance of the process has been achieved. In that case, the memory 100 will continue to scan the entire program of instructions, including all pages from beginning to end, at its usual rapid rate until the prerequisite condition has been met and the switch in question has closed to thus indicate that the process may proceed.

Furthermore, step 1 of the process may take much longer to be performed, once the step has been started, than the time required for the memory 100 to read out all of its instructions. In that case the memory 100 continues to read its complete instructions, including all pages thereof, time and time again, until step 1 of the process is completed and conditions are ripe for a move on to the next step of the process, for example, the step shown in FIG. 2.

It is not necessary that any, much less all, of the switches, or other circuit elements, of FIG. 2 be different from those of FIG. 1; in fact, some of them may be the same; for example, switch 12 of FIG. 2 may be the same switch as switch 12 of FIG. 1. Once the process has moved to the second step thereof, the hypothetical ladder diagram of FIG. 2 is analyzed, according to Table B, in the same way as was described in connection with FIG. 1 and Table A.

Similarly, there may be as many additional steps in the overall process as there are additional instructions therefor.

By way of definition, normally open switchs are considered standard circuit elements. Hence, normally closed switches are considered complements. So far as loads in a vertical output column are concerned, a normally "off" load is shown as a circle, thus: O. A load that is normally "on" is regarded as a complement and is shown thus: $\phi$.

FIGS. 7 to 14 relate to the preferred form of the invention. FIG. 7 illustrates a typical hypothetical ladder diagram for one step of the process. The hypothetical ladder diagram of FIG. 7 has the same general characteristics as that of FIG. 1; however, it is understood that the ladder diagram includes suitable means to prevent current flow from right to left along horizontal lines. As in the case of FIG. 1, the ladder is composed of four hypothetical horizontal rows and a plurality of hypothetical vertical input columns followed by a hypothetical vertical output column. Further, as in the case of FIG. 1, the hypothetical ladder diagram is such that, if switches and loads were actually connected to the ladder diagram, and suitable means provided to prevent current flow from right to left along horizontal lines, the device would work in the conventional manner that was commonplace many years ago. As shown by the arrows that are between FIGS. 7 and 8, each hypothetical vertical column of FIG. 7 has a code adapted to be stored in the memory of the processor. Since the code is somewhat different from that used in conjunction with FIG. 1, it will now be explained in detail.

The first horizontal line of FIG. 8 represents the "pattern". There are sixteen (16) possible patterns, each of which has an identification code therefor, see FIG. 10. It is noted that in determining the pattern, the only things considered are switches, and the position of the switches in the column. So far as the pattern is concerned, it makes no difference whether the switches are normally closed as in the case of switch 2 (FIG. 7) for example, or are normally open, see switch 1 of FIG. 7. Since the first vertical input column of FIG. 7 has switches in the first three horizontal rows, pattern code AA applies (see pattern 14 of FIG. 10).

The second hypothetical vertical input column of FIG. 7, comprising switches 4 and 5, conforms to pattern 9 of FIG. 10 and, therefore, has pattern code 9B. This pattern applies since there is no switch in the second horizonal row of the second vertical column of the hypothetical diagram of FIG. 7.

Immediately below the pattern (FIG. 8) are the addresses for the switches. It is noted that the addresses are in reverse order; that is, the address 03 comes first even though switch 3 is the lowest switch. Similarly, the next address 02 refers to switch 2, this being the third switch from the bottom of the ladder. Finally, the address 01 applies to switch 1 which is at the top of the ladder. Turning to the second column, the addresses 05 and 04 refer to the switches 5 and 4. It is not necessary to include an address for the blank space 701-702 in the second hypothetical vertical column because it is clear from the pattern code 9B, when considered in conjunction with code 58 as will hereinafter be explained, that there is no connection between points 701 and 702 (see FIG. 10, and Tables C and D infra).

We will next explain how the complement/vertical code referred to in the bottom line of FIG. 8 is determined. As shown in FIG. 11, there is a code consisting of two words of four digits each, the digits being designated in reverse order from $B_0$ to $B_7$. This represents in the binary code, or in some instances the hexadecimal code, as the case may be.

We next refer to FIG. 12 which shows the four horizontal rows having switches $R_1$ to $R_4$. The four horizontal output wires may be, or may not be, connected by jumpers $V_1$, $V_2$, or $V_3$. We will next explain how the digit 4 of the number 46 in the complement/vertical row of FIG. 8 was determined, and in this connection, we set forth below Table C, which is to be read in conjunction with FIGS. 11 and 12:

TABLE C

If $R_1$ is complemented, digit $B_7$ will be binary 1.
If $R_2$ is complemented, digit $B_6$ will be binary 1.
If $R_3$ is complemented, digit $B_5$ will be binary 1.
If $R_4$ is complemented, digit $B_4$ will be binary 1.

Therefore, since switch 2 of FIG. 7 is complemented it means that switch $R_2$ of FIG. 12 would be complemented, and therefore, by reference to Table C, we note that a binary 1 would appear at position $B_6$ of FIG. 11. Since that binary 1 represents 4 in the binary code, the first digit of the bottom row of FIG. 8 is, therefore 4.

We will next explain how the digit 6 of the number 46 was determined. The second digit of the code of the bottom row of FIG. 8 indicates the pattern of vertical connections between the horizontal rows of the hypothetical ladder, in accordance with Table D set forth below:

TABLE D

If vertical line $V_1$ of FIG. 12 is present, a binary 1 appears at position $B_3$ of FIG. 11.
If vertical line $V_2$ of FIG. 12 is present, a binary 1 appears at position $B_2$ of FIG. 11.
If vertical line $V_3$ of FIG. 12 is present, a binary 1 appears at position $B_1$ of FIG. 11.

Thus, since in FIG. 7 there are two hypothetical vertical wires (connecting the outputs of circuit elements of the column, namely, the wires 700 and 703 between the second and third and third and fourth horizontal rows respectively, the second and third rows of Table D are applicable, namely, there will be a binary 1 at each of positions $B_1$ and $B_2$ of FIG. 11. Since these positions represent number 6 in the binary code, it is clear that the second digit of the number 46 should be, and in fact is, 6.

We will next explain how the code 58 in the bottom horizontal row of the second vertical column of FIG. 8 was determined.

In the second hypothetical input vertical column, there is only one switch which is a complement, this being switch 5. Moreover, the wire between points 1106 and 1110 is a complement. Thus, according to Table C, binary 0101 or the number 5 is obtained as the first digit of the last number of the second vertical column of FIG. 8. The second hypothetical input vertical column of FIG. 7 has vertical wire 704 corresponding to $V_1$ of FIG. 12, but no vertical wires corresponding to positions $V_2$ and $V_3$ of FIG. 12. Therefore, since there is a vertical wire $V_1$, there will be a binary 1 in position $B_3$ of FIG. 11. Thus, the second binary number of FIG. 11, for the second hypothetical input vertical column of FIG. 7, would be 1000 which is 8. In that way it was determined that the second digit of code 58 was 8. The hypothetical output vertical column includes hypothetical loads 65 and 66 which are hypothetical counterparts of "real world" loads (or outputs).

We will next explain how the hypothetical output vertical column (comprising outputs 65 and 66) is represented in code form in FIG. 8. In the top row of FIG. 8, the characters "B 0" arbitrarily are selected to refer to the fact that the output, or storage, column is to be analyzed.

In the second row of the output column of FIG. 8 appears code "09" which represents the pattern of the hypothetical output vertical column.

The following table explains how one determines the first digit of the pattern of the hypothetical output vertical column:

TABLE E

| Line 1 | —O— | Binary 0 at $B_7$ |
| Line 1 | —Φ— | Binary 1 at $B_7$ |
| Line 2 | —O— | Binary 0 at $B_6$ |
| Line 2 | —Φ— | Binary 1 at $B_6$ |
| Line 3 | —O— | Binary 0 at $B_5$ |
| Line 3 | —Φ— | Binary 1 at $B_5$ |
| Line 4 | —O— | Binary 0 at $B_4$ |
| Line 4 | —Φ— | Binary 1 at $B_4$ |

Since neither of the outputs 65 and 66 are complements, there would be binary 0 signals at all of positions $B_4$ through $B_7$ inclusive of FIG. 11. Therefore, the first digit of the pattern 09 is "0".

Since both of the loads 65 and 66 are normally "off" and are turned on when energized, there are no loads which are "complements" and hence the first digit of the "Complement/Pattern" entry of FIG. 8 is 0. If there were one or more loads which were complements (loads that were normally running but which are turned off when its input is energized) the first digit of the "Complement/Pattern" entry of FIG. 8 would be determined according to Table C, supra.

We will next explain how the number "9" of the "Complement/Pattern" (FIG. 8) was determined by reference to Table F and to FIG. 11:

TABLE F

Binary 1 at $B_3$ if there is a load in Line 1.
Binary 1 at $B_2$ if there is a load in Line 2.
Binary 1 at $B_1$ if there is a load in Line 3.
Binary 1 at $B_0$ if there is a load in Line 4.

Since there is a load 65 on the first horizontal line of FIG. 7, there will be a binary 1 at position $B_3$ of FIG. 11 (see line 1 of Table F). Similarly, since there is a load 66 on the bottom horizontal line of said output column, there would be a binary 1 at position $B_0$ of FIG. 11 (see line 4 of Table F). However, since there is no load in either the second or the third rows of said output vertical column, a binary 0 appears at positions $B_1$ and $B_2$ of FIG. 11, as called for in Table F. Thus, the binary number 1001, which is Arabic 9, represents the second digit of the "Complement/Pattern" entry of FIG. 8. Thus, the "Complement/Pattern" entry of FIG. 8 is 09.

The next two numbers 65 and 66 of FIG. 8 represent the addresses of the two loads 65 and 66 of FIG. 7. The are placed in the same order in which they appear in the output vertical column, in contrast to the addresses of the hypothetical input vertical columns where the addresses appear in reverse order in FIG. 8 to the order of the switches of FIG. 7.

Finally, there is the arbitrary signal "FF' representing the end of the current page and the beginning of the next page.

Figure 9:
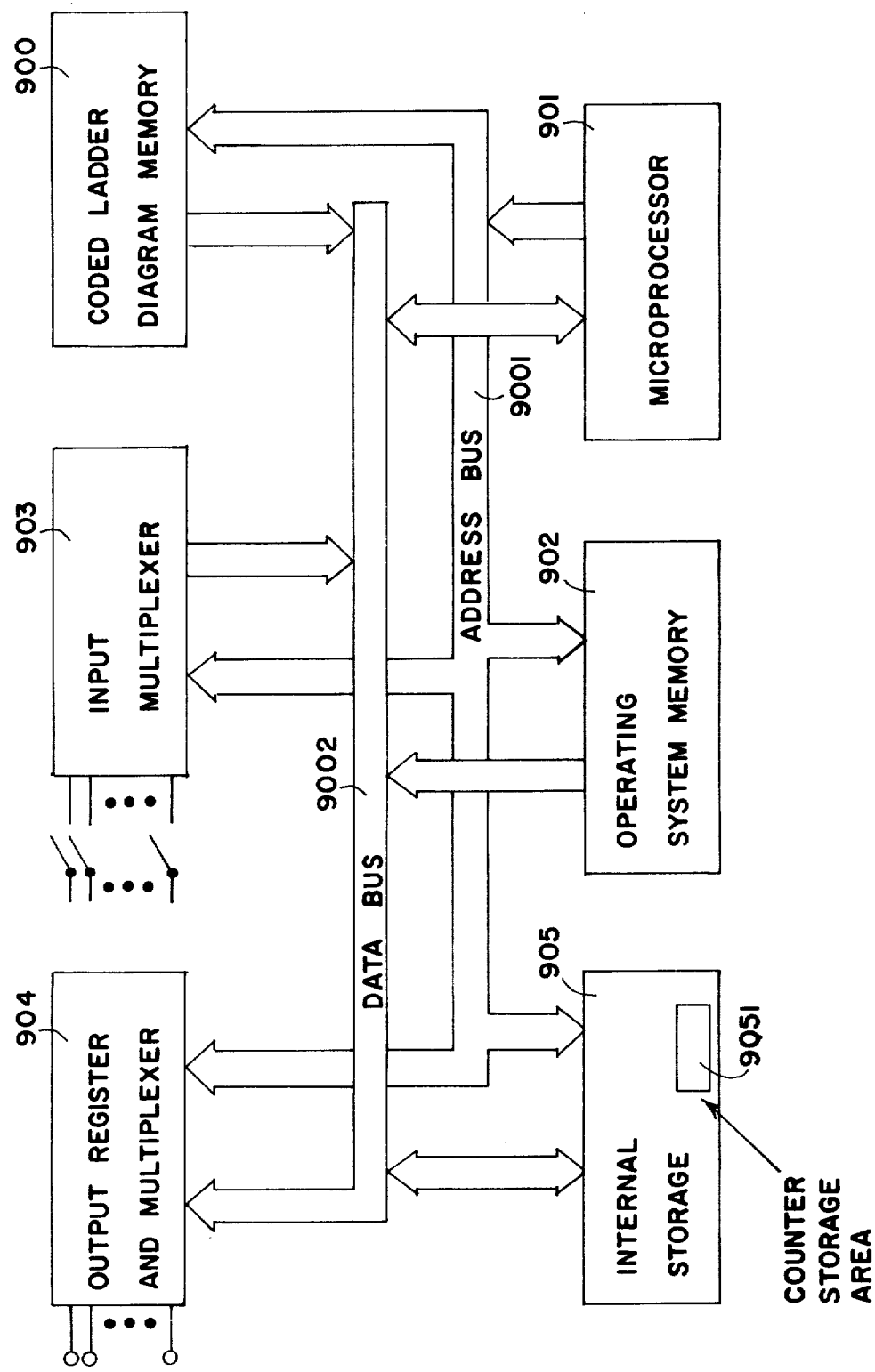
FIG. 9 is a block diagram of the apparatus employed in the preferred form of the invention.

FIG. 9 is a block diagram of a process control machine for analyzing the instructions such as those set forth in FIG. 8. The coded ladder diagram memory 900 is first filled with the instructions for the process. Recognizing that FIG. 8 sets forth the instructions for one step of the process, these instructions would be listed in the memory followed by the somewhat similar instructions for each succeeding step of the process in the desired sequence.

In filling the memory with the instructions of FIG. 8 it is noted that the instructions are inserted into the memory in column by column form, that is, the instructions in the left-hand vertical column appear first, followed by those in the second vertical column, and then followed by those in the storage column, as follows: FF, AA, 03, 02, 01, 46, 9B, 05, 04, 58, B0, 09, 65, 66.

The industrial engineer in charge of the plant may develop the aforesaid instructions and insert them in the memory 900, which is 8 bits wide and 1024 bits long, or he may have that done by someone else. However, the operating system of the memory 902 is a ROM memory having the instruction built into the same at the factory and directs the operation of the system as hereinafter described. This memory may be 8 bits wide and 2048 bytes long.

Both of memories 900 and 902 may be constructed in accordance with "Silicon Gate MOS 2708/2704, 8192/4096 Bit Erasable and Electrically Reprogrammable Read Only Memory", manufactured by Intel Corporation, 3065 Bowers Avenue, Santa Clara, Calif. 95051.

The microprocessor 901 may be one sold as MCS6502 manufactured by MOS Technology, Inc., 950 Rittenhouse Road, Norristown, Pa. 19401. That company described the aforesaid microprocessor in two publications, one entitled MICROCOMPUTERS HARDWARE MANUAL, and the other "Microcomputers Programming Manual", both dated Aug. 1975. Other suitable microprocessors include the Intel 8080, Intel 8085, Motorola 6800, Zilo g Z-80.

An internal storage 905 is employed which has various storage facilities. A suitable device that may comprise storage 905 is manufactured by Intel Corporation, 3065 Bowers Avenue, Santa Clara, Calif. 95051, and described by that company in a publication entitled "Silicon Gate CMOS 5101, 5101-3, 5101L, 5101L-3, 1024 BIT (256×4) STATIC CMOS RAM".

The input multiplexer 903 is conventional and may be the same as the input arrangement 25 in said U.S. Pat. No. 3,761,881. Alternatively, it may be built according to Tri-State Data Selectors/Multiplexers DM72/DM8214,19, National Semiconductor Corp., 2900 Semiconductor Drive, Santa Clara, Calif. 95051.

There is a conventional output register and multiplexer 904 which may be constructed in accordance with elements 70–74 of the aforesaid prior U.S. Pat. No. 3,761,882, or alternatively, it may comprise the Am93L08 "Low-Power Dual Four-Bit Latch", manufactured by Advanced Micro Devices, Inc., 901 Thompson Place, Sunnyvale, Calif. 94081.

We will next describe the method by which the resident software of apparatus of FIG. 9 implements the logic of ladder diagrams. This resident software is customarily called an "operating system" (abbreviated OS) or an "executive program" (abbreviated EXEC) because it is totally responsible for defining and managing the control functions of the apparatus of FIG. 9.

Before describing the operation of OS it will be necessary to describe the hardware environment in which it operates. FIG. 9 is a block diagram depicting the major interconnections among the major hardware modules.

The computer architecture used is a bus-structured organization comprised of one 16-bit address bus 9001 and one 8-bit data bus 9002. The busses are so organized such that the microprocessor 901 may communicate with units 900, 902, 903, 904 and 905 by issuing a 16-bit address on the address bus 9001 and then reading or writing an 8-bit data item on the data bus 9002. More specifically the microprocessor 901 can read data from units 900, 902 and 903, can write to unit 904, and can read and write to unit 905. All microprocessor requests for data input (READs) and for data storage (WRITEs) involve the transfer of 8 bits of information; however, depending upon the particular module involved in the transfer, fewer than 8 bits may contain useful information. In particular, a READ of the input multiplexer provides one valid bit of information to the microprocessor—the on/off status of the input device corresponding to the address on the address bus. Similarly, a WRITE from the microprocessor to the output multiplexer 904 stores one bit of information—the command to turn on (energize) or turn off (de-energize) the external device (load) which corresponds to the address of the address bus.

The content of operating system memory 902 is a computer program which, when supplied to and executed by the microprocessor 901, will dynamically define the logical interconnections and the sequences of data transfers which will occur among the system modules. The program is constructed in accordance with the requirements for the microprocessor as detailed in said two publications "Programming" and "Hardware Manual" published by MOS Technology.

It is the operating system memory 902 which gives the apparatus of FIG. 9 its logic, direction, and intelligence. The primary purpose of operating system memory 902 is to command the microprocessor 901 to perform a solution to the hypothetical ladder diagram stored in memory 900 and this includes addressing (via address bus 9001) the relevant sources of information such as memory 900 and input multiplexer 903 to thus read out and obtain information necessary to operate the process control system as described herein.

Consider the ladder diagram shown in FIG. 7, which will be used as an example in the following description.

Nodes 1101, 1102, 1103, and 1104 on the left-hand vertical line may be considered to be a source of electrical current which is switched by the network shown. If the setting of the switches in the network permits current conduction through the network to node 1113, output 65 will energize, otherwise it will de-energize. Likewise, if current can propogate from the left-hand vertical to node 1116 output 66 will energize, else it will de-energize. We define hypothetical current conduction through the network to be strictly left-to-right on all horizontal lines and to be bidirectional on all vertical lines. Thus, in FIG. 7, output 65 could be energized by current propogation through the node sequence 1101, 1105, 1109, 1113, or the sequence 1102, 1106, 1110, 1109, 1113, or the sequence 1103, 701, 1106, 1110, 1109, 1113. Similarly, output 66 could be energized by current propagation through the node sequence 1102, 1106, 701, 1108, 1112, 1116 or the sequence 1103, 701, 1108, 1112, 1116, but not by the sequence 1101, 1105, 1109, 1110, 1106, 701, 1108, 1112, 1116. The latter is disallowed because of the reverse path (right-to-left) from node 1110 to node 1106.

Between any two nodes on a horizontal line there must by one of four situations as shown in FIG. 13.

Current conduction is inhibited by a "no element" 1020 and allowed by a "jumper" 1021. Each normally open or normally closed switch has an address associated with it which specifies which of the system inputs is to be tested. A normally open switch with an address of, say, 4, allows conduction (left-to-right) if and only if the device physically connected to input 4 is on, and inhibits conduction if input 4 is off. Conversely, a normally closed switch 5 with address 5 will allow conduction if input 5 is off and will inhibit conduction if input 5 is on.

The rightmost column of a ladder diagram contains the loads, or outputs. In FIG. 7, output 65 will turn on if current can reach note 1113, else it will remain off. Output 66 will turn on if current can reach node 1116, else it will remain off.

The purpose of the operating system memory 902 is to furnish instructions to the microprocessor 901 which in turn will read out of the coded ladder diagram memory 900 a series of encoded definitions of switch ladder diagrams, decode them into the logical equivalent of their original geometry, test the system inputs referred to by each switch ladder diagram, simulate the current propagation properties of each switch ladder diagram, and energize or de-energize each output specified in the switch ladder diagram accordingly.

To understand further how this solution is accomplished, let us look at a simple switch ladder diagram (FIG. 7) and examine it at three levels of detail: (1) the equivalent circuit implemented in conventional circuit logic, (2) the overview of the operating system's simulation of conventional circuit diagram logic, and (3) the detail of the operating system's simulation of current propagation through a single column of conventional circuit logic.

Assume that the ladder diagram in FIG. 7 is implemented in conventional circuit logic. To make a simple example, assume that normally open relays 1, 3, and 4 and normally closed switches 2 and 5 are actuated by operating conditions of the machine to be controlled. Assume that the two outputs (loads) shown as 65 and 66 are lights which will illuminate when energized.

Thus implemented, we can follow all possible conduction paths through the ladder network to determine that light 65 will be on whenever (1) switches 1 and 4 are both on, or
(2) switch 2 is off, or
(3) switch 3 is on.

In a similar fashion we see that light 66 will be on whenever (1) switch 2 is off and switch 5 is off, or
(2) switch 3 is on and switch 5 is off.

It will be recalled that the reverse path from node 1110 to not 1106 does not conduct by definition, so that the condition of having switch 1 on, switch 4 on, and switch 5 off has no effect on light 66.

It is the purpose of the operating system, given a ladder diagram such as FIG. 7, to direct the microprocessor to sample the inputs (those devices referenced as switches), compute its current conduction characteristics, and energize or de-energize its output accordingly. Let us examine how the apparatus of FIG. 9 would solve the ladder diagram of FIG. 7. First, it must be supplied with an encoded version of the graphically-input ladder diagram, such encoding to be provided in coded ladder diagram memory 900, as a sequence of hexadecimal (base 16) numbers which the microprocessor under control of the operating system reads sequentially and then interprets. The purpose of encoding is to provide a more dense data format than the graphic characters would allow, thereby reducing the size of the coded ladder diagram memory. The method of encoding any graphic coded ladder diagram is discussed elsewhere in this application. The encoding for FIG. 7 is given in FIG. 8.

The encoded version of the coded ladder diagram in FIG. 7 is supplied as a sequence of hexadecimal digits in coded ladder diagram memory. For FIG. 7 that sequence is: FF, AA, 03, 02, 01, 46, 9B, 05, 04, 58, B0, 09, 65, 66.

When read and interpreted by the microprocessor, this sequence of numbers fully and completely defines the coded ladder diagram of FIG. 7. The switches 1 to 5 in the hypothetical ladder diagram of FIG. 7 are the hypothetical counterparts of "real world" inputs which may also be referred to as switches 1 to 5.

The microprocessor 901 under control of the operating system memory 900 computes the current propagation properties of any given coded ladder diagram by solving the individual vertical columns of the network, one at a time, working from left-to-right, and using the solution of each column as the inputs to that column's right-hand neighbor.

The solution of FIG. 7 is accomplished by interpreting the code in FIG. 8 as follows:

The operating system begins its simulation by first directing the microprocessor to read the on/off status of every input to the controller. To do this the microprocessor 901 sequentially applies the address of each input (such as switches 1 to 5 of FIG. 7) to the address bus, which causes the input multiplexer 903 to return the current binary status (1=on, 0=off) of the device at the supplied address. Each status bit thus sampled is transferred to a unique address in the internal storage memory 905, for future interrogation. The purpose of sampling all the inputs at nearly the same instant of time (within a few milliseconds of each other) is to form a "snapshot" of the state of the controlled process. The "input snapshot" thus generated is stored in the internal storage memory 905 and used as the official reference whenever the simulation of a ladder diagram interrogates the status of an input.

Having made its input snapshot, the operating system memory 902 directs microprocessor 901 to begin a sequential solution of the "pages" of the ladder diagram. An internal counter keeps track of which command in the coded ladder diagram memory 900 is next to be examined (all are examined sequentially). The internal counter is a part of internal storage 905. One of the storage areas 9051 of the internal storage 905 is used as a counter. Each time that the count is advanced by one number (such as by the operating system memory 902 directing the microprocessor 901 to take another instruction from the coded ladder diagram memory 900), the number stored in area 9051 is advanced by one. Thus, the number stored in area 9051 represents the number of instructions read from the coded ladder diagram memory 900. Assume this counter currently contains the memory address of the second word in FIG. 8, the "AA". The microprocessor 901 applies the contents of this counter to the address bus 9001 which causes the coded ladder diagram memory 900 to respond with the context of the addressed memory word on the 8-bit data bus 9002. Microprocessor 901 reads the data bus 9002, thereby obtaining the "AA". Operating system memory 902 directs microprocessor 901 to interpret "AA" to mean that a vertical column is being defined which contains three switches, one each on lines 1, 2, and 3. Having determined this much about the geometry of the column being defined, microprocessor 901 must now determine the addresses of the input devices which these three switches represent. Microprocessor 901 increments its counter of coded ladder diagram memory 900 commands, applies it to the address bus, and receives the next sequential command word from coded ladder diagram memory 900, in this case "03". Operating system memory 902 directs microprocessor 901 to interpret "03" to be the address in the internal storage 905 at which the on/off status of input device 3 has been previously stored by the input snapshot. Microprocessor 901 reads the single bit status of device 3 from internal storage 905 by applying this address to the address bus 9001 and reading the requested status bit from the data bus 9002. The status bit thus received is now stored as the conductive status of line 3, assuming temporarily a normally open switch. In a similar manner microprocessor 901 makes two more requests for command words from the coded ladder diagram memory 900, each word defining the memory location of device status bits. In this example, these next two fetches would return "02" and "01", the address of the switches on lines 2 and 1, respectively. The current on/off status of devices 2 and 1 are looked up in internal storage 905 and stored as the conductive status of lines 2 and 1, respectively. By definition of the geometry, line 4 contained no switch so its conductive status is stored as "off".

The next fetch from coded ladder diagram memory 900 returns the "complement/vertical" byte which completes the definition of the original vertical column geometry. The most significant four bits of this 8-bit word define which, if any, of the conductive values of lines 1-4 should be complemented, i.e., which lines contained either normally closed rather than normally open switches or jumpers instead of open connections. The next three bits define which, if any, of the three possible vertical connections exist on the right-hand side of the column. These three bits define connections between lines 1 and 2, 2 and 3, and 3 and 4. In this example the "complement/vertical" word was a "46", whose binary equivalent is "0100 0110", indicating a complement on line 2 and vertical connections between lines 2 and 3 and between lines 3 and 4. From the information thus collected it is now possible to compute the hypothetical presence or absence of current at this column's right-hand nodes (in this case, nodes 1105, 1106, 701, and 1108). The result of this computation is stored in storage 905.

Repeating this same strategy for the next column, microprocessor 901 fetches "9B" which it interprets as the definition of a vertical column with two switches, one each on lines 1 and 4. Two additional fetches from coded ladder diagram memory 900 supply "05" and "04", the addresses of the words in internal storage 905 which contain the on/off status of devices 5 and 4, respectively. The next fetch returns the "complement-/vertical" byte, a "58", whose binary equivalent is "0101 1000", indicating complements on lines 2 and 4 and a vertical connection between lines 1 and 2. Now, using nodes 1105, 1106, 701 and 1108 as inputs to the current column, the conduction properties of the column are solved and the status of nodes 1109, 1110, 1111, and 1112 computed and stored in storage 905. This process of computing current propagation on a column-by-column, left-to-right basis may be continued indefinitely to allow any number of relay columns to precede an output column.

The next fetch from coded ladder diagram memory 900 returns a "B0", indicating an output column rather than an input column. The next fetch returns the "complement/pattern" code whose first four bits define which, if any, of the right-hand nodes of lines 1–4 should be complemented before storing. The last four bits define which lines are to be stored. In the case of FIG. 8 the "complement/pattern" word is "09", whose binary equivalent is "0000 1001", indicating no complements in the column and two outputs, one each on lines 1 and 4. The next two fetches from coded ladder diagram memory 900 provide the address of an internal storage location in internal storage 905 to which the output values should be stored. In this example, the value of node 1113 is transferred to memory location 65 and the value of node 1116 is transferred to memory location 66.

Having completed an output column, the solution of this page of the ladder diagram of FIG. 8 is complete. Operating system memory 902 simply directs microprocessor 901 to continue the operation described above, sequentially evaluating all pages of the ladder diagram. When the last page has been solved, all output values will have been computed and stored in the internal storage 905 and will be ready for announcement to the real world. Microprocessor 901 reads the new values for all outputs from their location in internal storage 905 and sequentially transfers their addresses and values, via the address bus 9001 and data bus 9002 respectively, to the output register and multiplexer 904 which actually controls the attached output devices.

In addition to its primary task of solving ladder diagrams, operating system memory 902 may also provide in software eight timer/counter modules, each individually programmable to act as either a timer (counting down from a preset time in 0.1 second increments) or as a counter (counting up and/or down in units of 1, and setting its output whenever the current count equals or exceeds a preset count). These added counters form no part of the present invention other than they show the great flexibility of the system. The added counters have many uses in control of processes and machinery, as is well known. In addition, operating system memory 902 may provide an elaborate communications package which permits a program loader to be attached for purposes of programming, editing, monitoring, or forcing inputs and outputs. This too is no part of the invention and is an old expedient but makes the system more useful.

Looking at an arbitrary vertical input column, it can be modelled as a function of nineteen variables as shown in FIG. 14.

In FIG. 14 the binary variables $N1$, $N2$, $N3$, and $N4$ define the existence or absence of a hypothetical electrical current at the left-hand edge of the column on lines 1, 2, 3 and 4, respectively. Variables $R1$, $R2$, $R3$, and $R4$ represent the on/off status (on=1, off=0) of the switch (if any) on lines 1–4. Variables $V1$, $V2$, and $V3$ represent the existence (=1) or absence (=0) of the vertical connections between lines 1 and 2, 2 and 3, and 3 and 4, respectively. Variables $C1$, $C2$, $C3$, and $C4$ indicate whether the element on their respective line is a normally open switch or open connection ($C=0$) or whether it is a normally closed switch or a jumper ($C=1$). With this information the values of $N1'$, $N2'$, $N3'$, and $N4'$ can be computed using the following formulae, where the symbol "$*$" means Boolean AND, "$+$" means Boolean OR, and "$\oplus$" means Boolean EXCLUSIVE-OR:

$$N1' = N1*(R1 \oplus C1) + V1*[N2*(R2 \oplus C2) + V2*[N3*(R3 \oplus C3) + V3*N4*(R4 \oplus C4)]]$$

$$N2' = V1*N1*(R1 \oplus C1) + N2*(R2 \oplus C2) + V2*[N3*(R3 \oplus C3) + V3*N4*(R4 \oplus C4)]$$

$$N3' = V2*[N2*(R2 \oplus C2) + V1*N1*(R1 \oplus C1)] + N3*(R3 \oplus C3) + V3*N4*(R4 \oplus C4)$$

$$N4' = N4*(R4 \oplus C4) + V3*[N3*(R3 \oplus C3) + V2*[N2*(R2 \oplus C2) + V1*N1*(R1 \oplus C1)]]$$

Having collected the fifteen functional variables $N1$, $N2$, $N3$, $N4$, $R1$, $R2$, $R3$, $R4$, $C1$, $C2$, $C3$, $C4$, $V1$, $V2$, and $V3$, the operating system could solve for the N' values using the formulae given. In practice, however, this technique is too time consuming. The operating system for the Director 1001 implements an equivalent, but much faster, scheme. Realizing that the microprocessor can perform 4-bit Boolean operations in parallel, the operating system exploits that parallelism as follows:

(1) The on/off status of the input devices represented by the relays on each line are collected as a 4-bit vector in the variable R.

R:   R1 R2 R3 R4

(2) The conductive status of each left-hand column node is collected in a 4-bit vector N.
N:   N1 N2 N3 N4

(3) The "complement" portion of the "complement/vertical" word is isolated as a 4-bit vector C.

C:   C1 C2 C3 C4

(4) the "vertical" portion of the "complement/vertical" word is isolated as a 3-bit vector V.

V:   V1 V2 V3

(5) A bit-parallel computation is performed to produce an intermediate 4-bit vector T.

$$\vec{T} = (\vec{R} \oplus \vec{C}) * \vec{N}$$

(6) The 3 bit $\vec{V}$ vector is concatenated to 4 bit vector $\vec{T}$ to produce a 7-bit index vector $\vec{I}$.

$$\vec{I} = \vec{T} | | \vec{V}$$

(7) The $\vec{I}$ vector now specifies which one of 128 unique combinations of $\vec{N}, \vec{R}, \vec{C},$ and $\vec{V}$ are active for the current column evaluation. All 128 solutions for $\vec{N}'$ as a function of $\vec{N}, \vec{R}, \vec{C},$ and $\vec{V}$ have been precomputed and stored in a lookup table of length 128×4. The operating system selects the $\vec{I}$-th word of the lookup table as the solution for $\vec{N}'$.

I claim to have invented:

1. The method of controlling a process control system that has (i) an input multiplexer of the type which has a plurality of real world inputs that are parts of the process to be controlled and (ii) an output multiplexer of the type which has at least first and second real world outputs that are parts of the process to be controlled, said process control system including a data processor including a memory, comprising:

the step of generating a train of pulses representing a hypothetical ladder diagram which diagram comprises a plurality of hypothetical input vertical columns of hypothetical circuit elements at least some of said hypothetical circuit elements respectively being the hypothetical counterparts of at least some of said real world inputs, and a hypothetical output vertical column of hypothetical circuit elements following the input vertical columns, at least some of the hypothetical circuit elements of the hypothetical vertical column respectively being the hypothetical counterparts of real world outputs, said step of generating a train of pulses comprising generating the pulses in a predetermined order, and in groups, with each group representing one hypothetical vertical column, with the groups occurring in the same sequence that the hypothetical vertical columns appear in the hypothetical ladder diagram, and with the group representing the hypothetical output vertical column occurring after the groups representing the hypothetical input vertical columns have all occurred, storing said train of pulses in a memory and transmitting the various groups to particular addresses, respectively, in the memory, analyzing the hypothetical input vertical columns comprising addressing the memory in a given sequence to analyze the hypothetical input vertical columns one at a time and in the same sequence as such hypothetical vertical columns occur in the hypothetical ladder diagram, the analysis of each hypothetical input vertical column including the acts of (a) addressing the memory to obtain signals representing the pulses of said train representing the hypothetical vertical column under analysis, (b) addressing the input multiplexer to obtain input information in the form of signals respecting the real world inputs which are counterparts of hypothetical circuit elements of the hypothetical vertical column under analysis, (c) obtaining signals representing hypothetical potentials at the hypothetical inputs of the hypothetical circuit elements of the hypothetical vertical column under analysis, and (d) utilizing the signals obtained by reason of the immediately preceding steps (a), (b), and (c) to produce signals representing the hypothetical output conditions of the hypothetical circuit elements of the hypothetical input vertical column just analyzed; with the last-named signals representing the hypothetical input information for the next hypothetical vertical column of the hypothetical ladder, separately storing for each of at least two hypothetical circuit elements of the last input vertical column a real world signal, in the form of either binary 0 or binary 1, representing the output information of the circuit element, said analyzing step also including making an analysis of the hypothetical output vertical column by (a) addressing the memory to obtain the group of signals of said train representing said hypothetical output vertical column, (b) obtaining the separately stored signals representing the hypothetical output information from the last of the hypothetical input vertical columns of the hypothetical ladder diagram, and (c) generating first and second signals representing the desired condition of at least first and second of said real world outputs, and separately storing said first and second signals, such that first and second separate circuit elements of the hypothetical output vertical column separately and independently control via the output multiplexer said first and second real world outputs.

2. The method of controlling a process utilizing a process control system that has (i) an input multiplexer with a plurality of real world inputs which are a part of the process to be controlled, (ii) an output multiplexer with a plurality of real world outputs which are a part of the process to be controlled, and (iii) processing means including a memory, comprising:

the step of generating a train of pulses representing a hypothetical ladder diagram which diagram comprises a plurality of hypothetical input vertical columns of hypothetical circuit elements, followed by a hypothetical output vertical column of at least two hypothetical outputs representing said real world outputs which are to be controlled, whereby there are horizontal rows of circuit elements, said step of generating a train of pulses comprising generating the pulses in a predetermined order in which pulses representing a complete hypothetical input vertical column are followed by those representing the next complete hypothetical input vertical column and continuing generating such pulses representing input vertical columns until pulses representing all of the input vertical columns have been generated and following this with a train of pulses representing the output vertical column, providing data through the input multiplexer, representing input information with respect to each hypothetical circuit element of the first hypothetical input vertical column, storing said train of pulses in said memory and transmitting the various groups to particular addresses, respectively, in said memory, analyzing the operating condition of the first hypothetical input vertical column including the act of (a) addressing the memory to obtain information representing the hypothetical vertical column under analysis, (b) addressing the input multiplexer to obtain input information representive of the hypothetical circuit elements of the vertical column under analysis, from said real world inputs, and (c) obtaining input information relative to each circuit element of the first input vertical column, and (d) utilizing said information obtained by the immediately preceding three steps (a), (b) and (c) to produce output information representative of the hypothetical potential at the output of each hypothetical circuit element of said first hypothetical input vertical column analyzed, separately storing the output information relative to each hypothetical circuit element of said first hypothetical input vertical column while the second hypothetical input vertical column is analyzed, said last-named output information comprising signals representing hypothetical potentials at the inputs of the circuit elements of the second input vertical column, analyzing the operating condition of each hypothetical input vertical column after the first, in sequence, each such analyzing step including the act of (a) addressing said memory to retrieve information representing the vertical column under analysis, (b) addressing the input multiplexer to obtain input information, from said real world inputs, (c) addressing said last-named stored output information to produce signals representing hypothetical potentials at the hypothetical inputs of the circuit elements of the hypothetical input vertical column under analysis, and (d) utilizing the information from the last-mentioned steps (a), (b) and (c), to produce output information respecting the potential of the output of each hypothetical circuit element of the hypothetical input vertical column analyzed, storing, after each such analysis, except for that of the last vertical input column, the output information during the analysis of the next hypothetical vertical input column and using it as input information for the next analysis to indicate the hypothetical potentials at the inputs of the hypothetical circuit elements of the hypothetical input vertical column under analysis, separately storing the output information representing the output of each of a plurality of said hypothetical circuit elements of the last hypothetical input vertical column analyzed to provide selectively a binary 0 or a binary 1 for at least some of a plurality of said horizontal rows, and separately controlling via the output multiplexer each of said plurality of real world outputs in accordance with the last-named stored information and the information stored in said memory with respect to said hypothetical output vertical column, with the stored output information for one horizontal row being a control parameter for one real world output and the stored output information for another horizontal row being a control parameter for another real world output.

3. The method defined in claim 2, in which said step of generating a train of pulses, comprises:

developing a code of instructions which includes a peculiar set of digital signals for each configuration of circuit elements of an input vertical column, preparing a set of digital signals, according to said code of instructions, to represent each said input vertical column, storing said sets of digital signals, and reading out said stored sets of digital signals in the form of pulses to thereby generate said train of pulses.

4. A process control system having at least two inputs, each input being connected to a sensing element within the controlled process, and at least two outputs, in which at least one controlled device is connected to each of said outputs and is controlled by the operation of the control system in response to the condition of said inputs, where the operation of the control system is characterized by a hypothetical ladder diagram which represents, by a series of horizontal row and vertical column matrices, the logical connections of said inputs, said horizontal rows defining a plurality of input vertical columns followed by a vertical output column, said rows and columns representing a particular interconnection of hypothetical circuit elements, said process control system comprising:

first memory means containing stored information representing said ladder diagram, at least some of said hypothetical circuit elements of the input columns being the hypothetical counterparts of said first-named inputs respectively, second memory means for temporarily storing hypothetical output information of the hypothetical input vertical columns, data handling means for addressing the first memory to read out information stored for each hypothetical vertical column in sequence, and including means for addressing the second memory in connection with the analysis of each hypothetical vertical input column after the first one, and including means for analyzing said hypothetical input vertical columns in said sequence with the analysis of each vertical column being responsive to (a) the stored information in said first memory means relating to the hypothetical input vertical column under analysis, (b) the condition of the first-named inputs that relate to the hypothetical input vertical column under analysis, and (c) the hypothetical input information relating to the hypothetical circuit elements of the hypothetical vertical column under analysis; to produce output data, for the hypothetical vertical column, under analysis, that indicates whether or not there is a hypothetical voltage at the hypothetical output of each hypothetical circuit element of the hypothetical input vertical column, said data handling means also including (i) means for addressing the first memory to read out information representing the output vertical column, (ii) means for addressing the second memory to read out output information for the last vertical input column, and (iii) means for combining the information obtained, as a result of the operations referred to in items (i) and (ii) to produce separate items of output information respectively relative to a plurality of horizontal rows, said process control system including at least one memory for storing said last-named output information, with the output information for each of said plurality of rows being separately stored as either a binary 0 or a binary 1, and said data handling means including means for transmitting said output data relative to each vertical column to said second memory means, so that the results of the analysis of a vertical column will be available to said data handling means during the analysis of the next vertical column, and means separately controlling one of said first-named outputs according to whether the stored information respecting one horizontal row is a binary 0 or a binary 1 and for separately controlling another one of said first-named outputs according to whether the stored information respecting another horizontal row is a binary 0 or a binary 1.

5. A process control system as defined in claim 4 in which said first memory means contains stored information comprising a set of digital signals peculiar to each said input vertical column, which digital signals conform to a code of instructions applicable to all input vertical columns, said digital signals including digital signals representing (a) the location of each circuit element in the column, (b) whether or not such circuit element is a complement and (c) whether such circuit element has an output connection connecting it to the output of the circuit element beneath it in the column.

6. A process control system having at least two inputs, each input being connected to a sensing element within the controlled process, and at least two outputs, in which at least one controlled device is connected to each of said outputs and is controlled by the operation of the control system in response to the condition of said inputs, where the operation of the control system is characterized by a hypothetical ladder diagram which represents, by a series of row by column matrices of hypothetical circuit elements each having a hypothetical input, the logical connections of said first-named inputs, the last vertical column being an output column and the preceding columns being input vertical columns, said process control system comprising:

input multiplexer means responsive to the status of said plurality of first-named inputs, data handling means including an output multiplexer for controlling said loads in accordance with the status of said inputs, memory means containing stored information specifying said hypothetical ladder diagram comprising hypothetical vertical columns of hypothetical circuit elements some of which hypothetical circuit elements are respectively hypothetical counterparts of said plurality of inputs, said memory means containing information specifying the geometry of each hypothetical vertical column, said data handling means including means for sequentially analyzing the aforesaid hypothetical vertical columns, (a) said last-named means including apparatus for addressing said memory means to read out signals specifying the geometry of the hypothetical vertical column under analysis, (b) said last-named means also including apparatus for addressing said input multiplexer means to read out signals specifying the status of the first-named inputs, and (c) said last-named means including apparatus to provide signals representing the status of the hypothetical inputs of the hypothetical circuit elements of the hypothetical input vertical column under analysis;

said last-named means including means responsive to the signals referred to in paragraphs (a), (b), and (c) to produce signals representing output information of the vertical input column under analysis, storage means for storing signals representing hypothetical output data from each of a plurality of hypothetical circuit elements of the last of the hypothetical input vertical columns, said data handling means including means for separately controlling each of said plurality of first-named outputs by addressing said memory means and said storage means, to obtain information relative to the status of the (i) outputs of the circuit elements of the last vertical input column, and (ii) the geometry of the hypothetical output vertical column, and for controlling each of said plurality of first-named outputs in accordance with the signals stored in said storage means with the stored signals representing one horizontal row controlling one of the first-named outputs and the stored signals representing another horizontal row separately controlling another of the first-named outputs.

7. A process control system having at least two real world inputs, each input being connected to a sensing element within the controlled process, and at least two real world outputs, in which at least one controlled device is connected to each of said outputs and is controlled by the operation of the control system in response to the condition of said inputs, where the operation of the control system is characterized by a ladder diagram which represents, by a series of row by column matrices, the logical connections of said inputs, said process control system comprising:

first memory means for storing information specifying a plurality of hypothetical circuit elements that comprise a plurality of hypothetical vertical columns, and for also storing information specifying hypothetical elements comprising a hypothetical vertical output column and control information relating to that output column with said real world outputs being counterparts of said last-named elements, with said real world inputs being the counterparts of at least some of said hypothetical circuit elements, processing means for sequentially analyzing said hypothetical vertical columns by addressing said memory to read out information with respect to each given hypothetical vertical column and including means for combining that information with respect to any given hypothetical vertical column with the one or ones of said real world inputs that are counterparts to said input vertical column, to produce output information representing the presence or absence of a hypothetical voltage respectively, at each hypothetical output node of a circuit element of the hypothetical vertical column under analysis, and second memory means for storing a signal representative of the hypothetical voltages on the hypothetical output nodes of the hypothetical vertical column under analysis, with there being a stored binary 0 or a binary 1 representing the hypothetical voltage on each of a plurality of output nodes of the last input vertical column, said processing means including addressing and selecting means for (a) fetching from said first memory means signals specifying the elements which comprise said hypothetical vertical output column and the control information relating to that hypothetical vertical output column and (b) utilizing said control information for selecting the real world outputs to be respectively controlled by given signals in said second storage means, said addressing and selecting means including means for controlling one real world output according to the stored signal representing one of said nodes of the last input vertical column and for controlling another real world output separately and independently according to the stored signal representing another one of said nodes of the last input vertical column.

8. A process control as described in claim 7 in which said second-named means comprises:
horizontal and vertical latches set during the analysis of each hypothetical vertical column to represent the output connections of each hypothetical circuit element, and
a matrix connecting said latches to said second storage means to thus provide said second storage means with output information on the hypothetical vertical column under analysis.

9. A process control as defined in claim 7 in which said second-named means is a microprocessor.

10. In a process control system having an input multiplexer that has a plurality of inputs for sensing the condition of operations of the process and an output multiplexer that has a plurality of outputs for controlling the process, comprising:
memory means for storing a hypothetical ladder diagram comprising a plurality of circuit elements making up said input vertical columns having circuit elements arranged in said horizontal rows, input horizontal rows and input vertical columns of elements, which diagram represents a control system which is capable of controlling said process in the desired manner, and which is also capable, in cooperation with said input multiplexer, of providing output signals at the ends of at least two of said input horizontal rows, said hypothetical ladder diagram also comprising a hypothetical vertical output column following the hypothetical vertical input columns,
data handling means for addressing the input multiplexer and said memory means to receive signals therefrom and for analyzing said ladder diagram on a column by column basis and providing signals representing the outputs of at least two horizontal rows of input vertical columns, and
storage means for storing the last-named signals such that the signals representing different rows are stored in different locations in said storage means,
said data handling means including output means for receiving from said memory means the stored information representing said hypothetical vertical output column, and for combining said last-named information with said signals in said storage means to determine which horizontal row should control each given real world output,
said output means for separately controlling, via the output multiplexer, two of said first-named plurality of outputs, using as control parameters two separate outputs from two of said rows respectively using one of said separate outputs as a parameter in the control of one of said first-named outputs and another of said separate outputs as a parameter in the control of another of said first-named outputs.

11. The method of controlling a process control system that has (i) an input multiplexer of the type which has a plurality of real world inputs that are parts of the process to be controlled and (ii) an output multiplexer of the type which has at least first and second real world outputs that are parts of the process to be controlled, said process control system including a data processor including a memory, comprising:
generating a train of pulses that represents a ladder diagram of circuit elements arranged in horizontal rows with input vertical columns and an output vertical column, which diagram is the diagram of a control system which in combination with said multiplexers will control said process in the desired manner, and in which the circuit elements of the input vertical column represent said first-named inputs and circuit elements of the output vertical column represent said first-named outputs,
storing said train of pulses in said memory with separate addresses for different vertical columns,
addressing said memory and said input multiplexer to fetch information relative to the first vertical column and then analyzing that vertical column, then analyzing the remaining input vertical columns on a column by column basis using the output data of one column as input information for the next one and for each input column addressing said memory and said input multiplexer to fetch information needed for the analysis of that column, to produce signals representative of whether a binary 0 or a binary 1 would appear at each of a plurality of the outputs of a given horizontal row in an actual control system,
separately storing in a storage means for each of a plurality of rows of said ladder diagram the binary signal representing the output of that row, and
addressing said memory to fetch information representing the vertical output column, and addressing said storage means to fetch said last named stored signals, and utilizing the information and signals received as a result of said fetching steps to separately and independently control via the output multiplexer at least two different outputs of said output multiplexer and exercise control over said process in said desired manner.

* * * * *